United States Patent
Cameron et al.

(10) Patent No.: US 12,493,772 B1
(45) Date of Patent: Dec. 9, 2025

(54) LAYERED MULTI-PROMPT ENGINEERING FOR PRE-TRAINED LARGE LANGUAGE MODELS

(71) Applicant: Citibank, N.A., New York, NY (US)

(72) Inventors: William Franklin Cameron, Jacksonville, FL (US); Miriam Silver, Tel Aviv (IL); Manjit Rajaretnam, Irving, TX (US)

(73) Assignee: CITIBANK, N.A., NY (US)

( * ) Notice: Subject to any disclaimer, the term of this patent is extended or adjusted under 35 U.S.C. 154(b) by 0 days.

(21) Appl. No.: 18/759,617

(22) Filed: Jun. 28, 2024

Related U.S. Application Data

(63) Continuation-in-part of application No. 18/737,942, filed on Jun. 7, 2024, now Pat. No. 12,154,019.

(51) Int. Cl.
| | | |
|---|---|---|
| *G06N 3/045* | (2023.01) | |
| *G06F 40/40* | (2020.01) | |
| *G06N 3/0475* | (2023.01) | |
| *G06N 3/08* | (2023.01) | |

(52) U.S. Cl.
CPC ............ *G06N 3/045* (2023.01); *G06F 40/40* (2020.01); *G06N 3/0475* (2023.01); *G06N 3/08* (2013.01)

(58) Field of Classification Search
CPC ........ G06N 3/045; G06N 3/0475; G06N 3/08; G06F 40/40
USPC .......................................................... 706/25
See application file for complete search history.

(56) References Cited

U.S. PATENT DOCUMENTS

| | | | |
|---|---|---|---|
| 10,426,442 | B1 | 10/2019 | Schnorr |
| 11,164,078 | B2 | 11/2021 | Jin et al. |
| 11,521,716 | B2 | 12/2022 | Vianu et al. |
| 11,790,244 | B2 | 10/2023 | Sathiaraj |
| 11,893,341 | B2 | 2/2024 | Itani |

(Continued)

FOREIGN PATENT DOCUMENTS

| | | |
|---|---|---|
| CN | 115796299 A | 3/2023 |
| CN | 116775837 A | 9/2023 |

(Continued)

OTHER PUBLICATIONS

Dakhel et al, Apr. 2024, "Effective test generation using pre-trained Large Language Models and mutation testing" (Year: 2024).*

(Continued)

*Primary Examiner* — Abdullah Al Kawsar
*Assistant Examiner* — Jun Kwon
(74) *Attorney, Agent, or Firm* — Perkins Coie LLP

(57) ABSTRACT

Systems and methods for constructing layered prompts to operate as input into a pre-trained large language model (LLM). The method involves obtaining a set of application domains in which the LLM will be used. Using these application domains, a set of guidelines is determined, defining operation boundaries for the LLM. A set of layers is determined, each associated with the guidelines and including variables representing attributes identified within those guidelines. Using these layers, a first layered prompt is constructed to test the initial operation boundaries of the guidelines and is supplied to the LLM to generate a set of responses. Based on the responses, a second layered prompt is dynamically constructed to test additional operation boundaries, ensuring iterative refinement and contextual relevance.

20 Claims, 12 Drawing Sheets

(56) References Cited

U.S. PATENT DOCUMENTS

| | | | |
|---|---|---|---|
| 12,001,462 B1 | 6/2024 | Madisetti et al. | |
| 12,061,970 B1 | 8/2024 | Lo et al. | |
| 2014/0297954 A1 | 10/2014 | Clevenger | |
| 2018/0307894 A1 | 10/2018 | Lim et al. | |
| 2020/0043164 A1 | 2/2020 | Fuchs et al. | |
| 2020/0334326 A1 | 10/2020 | Zhang et al. | |
| 2020/0349466 A1* | 11/2020 | Hoogerwerf | G06N 20/00 |
| 2021/0012486 A1 | 1/2021 | Huang et al. | |
| 2022/0004923 A1 | 1/2022 | Kamkar et al. | |
| 2023/0018960 A1 | 1/2023 | Ardel | |
| 2023/0177116 A1* | 6/2023 | Laganakos | G06N 3/08 706/15 |
| 2023/0274089 A1 | 8/2023 | Tunstall-pedoe et al. | |
| 2023/0316003 A1 | 10/2023 | Friedman et al. | |
| 2024/0095463 A1 | 3/2024 | Leary et al. | |
| 2024/0111960 A1 | 4/2024 | Earle et al. | |
| 2024/0146734 A1 | 5/2024 | Southgate et al. | |
| 2024/0202539 A1 | 6/2024 | Poirier et al. | |
| 2024/0242040 A1 | 7/2024 | Cogswell et al. | |
| 2024/0273306 A1 | 8/2024 | Somaiya et al. | |
| 2024/0330466 A1 | 10/2024 | Constable et al. | |
| 2024/0333741 A1 | 10/2024 | Abdelrahman et al. | |
| 2024/0338387 A1 | 10/2024 | Iscen et al. | |

FOREIGN PATENT DOCUMENTS

| | | |
|---|---|---|
| CN | 117391216 A | 1/2024 |
| CN | 117453915 A | 1/2024 |
| CN | 117633174 B | 6/2024 |
| CN | 118170874 A | 6/2024 |
| WO | 2022135973 A1 | 6/2022 |
| WO | 2023161630 A1 | 8/2023 |

OTHER PUBLICATIONS

Do et al, Apr. 3, 2024, "Automatic Prompt Selection for Large Language Models" (Year: 2024).*

Naveed et al, 2023, "A Comprehensive Overview of Large Language Models" (Year: 2023).*

AI Risk Management Framework NIST, retrieved on Jun. 17, 2024, https://www.nist.gov/itl/ai-risk-management-framework.

Independent analysis of AI language models and API providers. Artificial Analysis, retrieved on Jun. 13, 2024, https://artificialanalysis.ai/, 11 pages.

Brown, D., et al., "The Great AI Challenge: We Test Five Top Bots on Useful, Everyday Skills," The Wall Street Journal, published May 25, 2024.

Dong, Y., et al., "Building Guardrails for Large Language Models," https://ar5iv.labs.arxiv.org/html/2402.01822v1, published May 29, 2024, 20 pages.

Mavrepis, P., et al., "XAI for All: Can Large Language Models Simplify Explainable AI?," https://arxiv.org/abs/2401.13110, Jan. 23, 2024, 10 pages.

Mollick, E., "Latent Expertise: Everyone is in R&D," One Useful Thing, published on Jun. 20, 2024, https://www.oneusefulthing.org/p/latent-expertise-everyone-is-in-r.

Zhao, H., et al., "Explainability for Large Language Models: A Survey," https://arxiv.org/abs/2309.01029, Nov. 28, 2024, 38 pages.

Aggarwal, Nitin, "Why measuring your new AI is essential to its succes", KPIs for gen AI: Why measuring your new AI is essential to its succes, 7 pages.

AI, "What is AI Verify?", What is AI Verify—AI Verify Foundation.

Altman, Sam, "Sam Altman Admits That OpenAI Doesn't Actually Understand How Its AI Works", Sam Altman Admits That OpenAI Doesn't Actually Understand How Its AI Works—"We certainly have not solved interpretability.", 4 pages.

ANTHROP/C, "Mapping the Mind of a Large Language Model", Mapping the Mind of a Large Language Model, May 21, 2024.

Claburn, Thomas, "OpenAI's GPT-4 can exploit real vulnerabilities by reading security advisories", OpenAI's GPT-4 can exploit real vulnerabilities by reading security advisories, Apr. 17, 2024, 3 pages.

Marshall, Andrew, "Threat Modeling AI/ML Systems and Dependencies", Threat Modeling AI/ML Systems and Dependencies, Nov. 2, 2022, 27 pages.

Roose, Kevin, "A.I. Has a Measurement Problem", A.I. Has a Measurement Problem, Apr. 15, 2024, 5 pages.

Roose, Kevin, "A.I.'s Black Boxes Just Got a Little Less Mysterious", A.I.'s Black Boxes Just Got a Little Less Mysterious, May 21, 2024, 5 pages.

Shah, Harshay, "Decomposing and Editing Predictions by Modeling Model Computation", Decomposing and Editing Predictions by Modeling Model Computation, 5 pages.

Shankar, Ram, "Failure Modes in Machine Learning", , Nov. 2019, 14 pages.

Teo, Josephine, "Singapore launches Project Moonshot", Singapore launches Project Moonshot—a generative Artificial Intelligence testing toolkit to address LLM safety and security challenges, May 31, 2024, 8 pages.

Mathews, A. W., "What AI Can Do in Healthcare—and What It Should Never Do," The Wall Street Journal, published on Aug. 21, 2024, retrieved on Sep. 5, 2024, https://www.wsj.com.

Brown, Nik Bear, "Enhancing Trust in LLMs: Algorithms for Comparing and Interpreting LLMs", ARXIV ID: 2406.01943 Publication Date: Jun. 3, 2024, pp. 1-58. (Year: 2024).

Chen, Kua, et at, Automated Domain Modeling with Large Language Models: A Comparative Study, 2023 ACM/IEEE 26th International Conference on Model Driven Engineering Languages and Systems (MODELS) (2023, pp. 162-172) (Year: 2023).

Wang, Yudong, et al., "Exploring Activation Patterns of Parameters in Language Models", ARXIV ID: 2405.17799 Publication Date: May 27, 2024, pp. 1-23. (Year: 2024).

Zhou, Y., Liu, Y., Li, X., Jin, J., Qian, H., Liu, Z., Li, C., Dou, Z., Ho, T., & Yu, P. S. (2024). Trustworthiness in Retrieval-Augmented Generation Systems: A Survey. ArXiv. /abs/2409.10102.

Malode, 2023, "Benchmarking public large language model" (Year: 2023).

* cited by examiner

LAYERED MULTI-PROMPT ENGINEERING FOR PRE-TRAINED LARGE LANGUAGE MODELS

CROSS-REFERENCE TO RELATED APPLICATION(S)

This application is a continuation-in-part of U.S. patent application Ser. No. 18/737,942 entitled "SYSTEM AND METHOD FOR CONSTRUCTING A LAYERED ARTIFICIAL INTELLIGENCE MODEL" filed on Jun. 7, 2024. The content of the foregoing applications are incorporated herein by reference in its entirety.

BACKGROUND

Artificial intelligence (AI) models often operate based on extensive and enormous training models. The models include a multiplicity of inputs and how each should be handled. When the model receives a new input, the model produces an output based on patterns determined from the data the model was trained on. AI models provide a more dynamic and nuanced approach to security by continuously analyzing vast amounts of data to identify potential threats and vulnerabilities. However, there is a lack of transparency in AI models. Unlike traditional rule-based methods and signature-based detection techniques, which are more transparent, AI models operate on algorithms that are often opaque to end-users since the user is only exposed to the AI model's received input and the AI model's output. The lack of visibility into the inner workings of AI models raises concerns about the AI model's reliability and trustworthiness, as security analysts are unable to verify the integrity of the AI model or assess the AI model's susceptibility to adversarial attacks.

Figure 1:
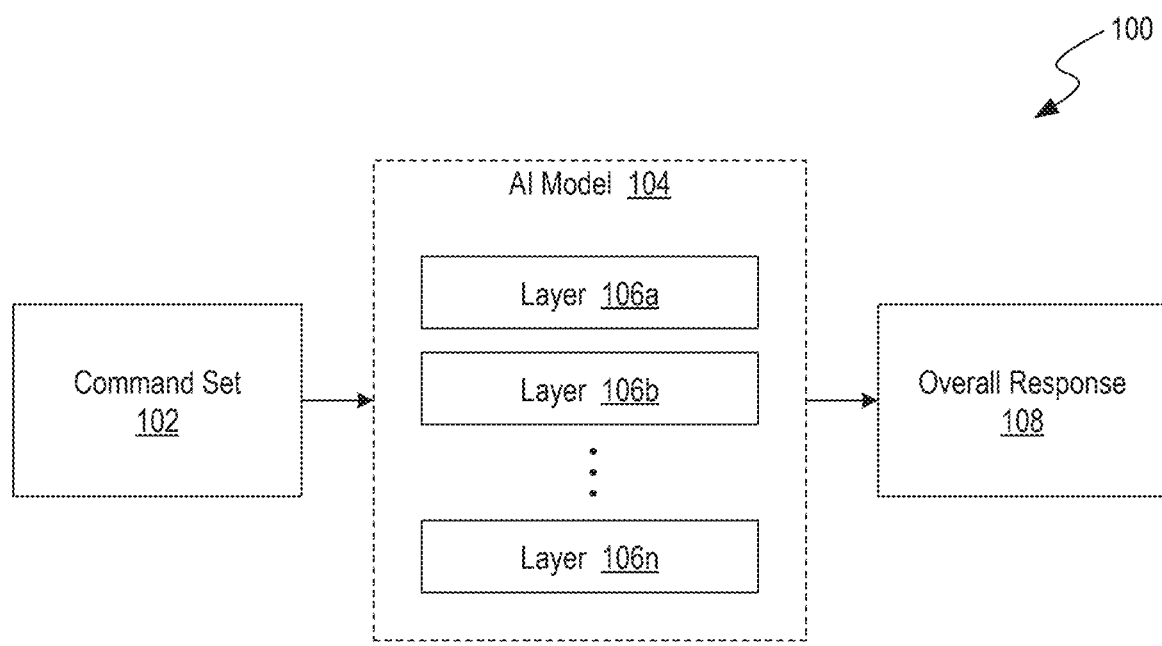
FIG. 1 is an illustrative diagram illustrating an example environment of a layered artificial intelligence (AI) model, in accordance with some implementations of the present technology.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the specific implementations described. On the contrary, the technology is intended to cover all modifications, equivalents, and alternatives falling within the scope of the technology as defined by the appended claims.

DETAILED DESCRIPTION

AI applications offer a powerful framework for extracting insights and making predictions from data. One of the key advantages of AI applications lies in an AI model's ability to automatically identify patterns and relationships within complex datasets, even in the absence of explicit programming. This capability enables AI applications to uncover relationships, predict future outcomes, and drive data-driven decision-making across various fields. However, the rapid deployment and integration of LLMs have raised significant concerns regarding their risks including, but not limited to, ethical use, data biases, privacy and robustness. Further, as AI technologies continue to evolve, so do the regulatory landscapes governing the created AI applications. AI applications face increasing scrutiny and legal obligations to ensure that AI applications comply with the evolving regulations and ethical standards.

Traditional approaches to using AI models, for example, to secure computing platforms typically involve users providing an input (e.g., a command set or prompt) and receiving output predictions. However, the inner workings of the AI model, including the algorithms and decision-making processes employed, remain opaque to the user. From the user's perspective, the AI model functions as a "black box," where the input is fed into the system, and the output prediction is produced without visibility into the underlying logic. Once the input data is processed by the AI model, users receive output predictions (e.g., in a cybersecurity context, an AI model could indicate whether each access attempt is deemed authorized or unauthorized). These predictions can inform security decisions and actions taken by users or automated systems. Since the AI model is a "black box," attempts to prevent unwanted AI model outputs include filtering out potentially risky inputs using pre-defined rulesets, rather than addressing the root cause of the problem (e.g., being unable to understand the decision-making processes of the AI model). Without understanding how the AI model processes information and generates outputs, simply filtering inputs through pre-defined rules is a superficial measure that can easily be circumvented or fail to catch unforeseen risky inputs. Moreover, this approach does not improve the model's underlying reliability or transparency.

A common issue faced by engineers due to the lack of visibility into AI algorithm logic is the inability to validate the accuracy and effectiveness of the AI model's outputs. Security professionals require confidence in the methodologies used by AI models to make informed decisions about platform security. Without a clear understanding of the underlying logic, engineers may be hesitant to trust the outputs of AI models. Moreover, the lack of transparency into AI algorithm logic hinders efforts to diagnose and address security vulnerabilities effectively. In the event of a security breach or incident, engineers need to understand how the AI model arrived at its conclusions to identify the root cause of the problem and implement appropriate remediation measures. However, without insight into the decision-making process of the algorithms, diagnosing and resolving security issues becomes significantly more challenging. Additionally, the lack of visibility into AI algorithm logic can exacerbate concerns about adherence to regulations or guidelines. If engineers cannot discern how AI models weigh different factors or make decisions, it becomes difficult to ensure that the algorithms adhere to the regulations or guidelines. The opacity may lead to unintended consequences, such as disproportionate impacts on certain user groups or overlooking security vulnerabilities. Further, the need to work with multiple requirements/dimensions (such as, compliance with regulations; ethical principles such as fairness, privacy, and IP; ensuring outputs free from unintended responses such as offensive ensuring or hate speech; outputs free from incorrect/unsubstantiated responses/hallucinations; etc.) makes the challenges worse, especially when some requirements can be conflicting. Such complexity requires a sophisticated solution system.

Another traditional approach to using AI models includes constructing prompts (e.g., prompt engineering) for evaluating or assessing the performance of AI models such as large language models (LLMs) by using single or multiple prompts designed to guide the behavior and responses of the LLMs. In a single prompt approach, a prompt is constructed to include all necessary context, instructions, and desired outcomes in one input of the LLM. On the other hand, a multi-prompt approach involves creating a series of individual prompts, each focusing on a specific aspect of the task or topic.

However, rather than addressing the root of the problem (e.g., being unable to understand the decision-making processes of the "black box" AI model), constructing prompts by using traditional single-prompt methods often lead to prompts that are overly complex and ambiguous. The LLM may struggle to parse the various elements accurately, resulting in responses that are inconsistent or misaligned with the user's expectations. For instance, a single prompt designed to assess an LLM's understanding of legal principles may mix questions about case law, statutory interpretation, and ethical considerations, leading to muddled and unfocused answers. Further, traditional multi-prompt approaches suffer from a lack of coherence and integration. Each prompt operates independently, without a structured mechanism to link responses or build upon previous answers systematically. The disjointed method can result in fragmented and inconsistent outcomes, as the LLM may fail to integrate information across prompts to form a comprehensive and cohesive understanding or response. For example, in a healthcare application, separate prompts about symptoms, medical history, and treatment options may not be effectively combined, leading to incomplete or contradictory medical advice.

Traditional prompt engineering does not provide the necessary transparency and accountability. Without a structured approach, it is challenging to trace the LLM's decision-making process and understand how specific responses were generated. The opacity is particularly problematic for compliance and auditing purposes, especially in regulated industries where understanding the rationale behind decisions affects regulatory compliance. For example, in the context of regulatory compliance in finance, knowing how an LLM arrived at a particular recommendation or decision (e.g., whether a particular customer is granted a loan) can directly correlate with whether the LLM aligns with legal requirements.

Traditional approaches also lack adaptability in evaluating or assessing LLMs. Since traditional prompts remain static, the prompts are not easily modified to incorporate new or updated guidelines, standards, or regulations, making it difficult to maintain the relevance and accuracy of the LLM's outputs over time. This rigidity poses a significant challenge in dynamic environments where the prompt must adapt to new information or evolving guidelines. For instance, in financial forecasting, where market conditions can change rapidly, static prompts may quickly become outdated, leading to inaccurate or irrelevant predictions.

Thus, there is a need for determining particular explanations of particular AI model outcomes. The inventors have developed an improved method and system for constructing a layered AI model that covers the development cycle (from requirements, to design, implementation, integration, deployment, verification and validation) of AI models. The method involves constructing a layered AI model by determining a set of layers, where each layer relates to a specific context/dimension. Within each layer, a set of variables is defined to capture attributes identified within the corresponding context. The variables serve as parameters for the layer-specific model logic, which generates layer-specific results in response to inputs. To construct the layered AI model, the determined set of layers is used to train an AI model. This training process involves developing layer-specific model logic for each layer, tailored to generate layer-specific results based on the corresponding set of variables. Once trained, the AI model is capable of applying the layer-specific model logic of each layer to a command set, thereby generating layer-specific responses. These responses include the layer-specific results and a set of descriptors indicating the model logic used for each layer. After generating layer-specific responses, the system aggregates them using predetermined weights for each layer. This aggregation process yields a set of overall responses to the command set, comprising an overall result and an overall set of descriptors associated with the layer-specific responses. These descriptors provide insights into the decision-making process of the AI model, allowing users to understand how each layer contributes to the overall result.

In various implementations, the system receives an indicator of the application type associated with the AI model, identifies a relevant set of layers based on this indicator, and obtains the corresponding set of layers via an Application Programming Interface (API). Additionally, the system can dynamically determine the set of layers using machine learning algorithms or based on received input indicating specific contexts associated with the AI model. In various implementations, the determination of the set of layers for the AI model can be dynamically adjusted based on real-time feedback and observations. This dynamic approach involves continuously monitoring the performance and effectiveness of the existing layers and adjusting the set of layers accordingly. For example, if new security threats or vulnerabilities are identified, additional layers can be introduced to address these specific concerns. Conversely, if certain layers are found to be redundant or ineffective, they can be removed or modified to improve the overall performance of the AI model.

Using a layered AI model, the system allows users to understand the specific contexts and variables considered at each layer, and thus offers the user a particular explanation for particular outcomes of the AI model. Each layer's model logic is constructed based on identifiable parameters and attributes associated with the corresponding context, making it easier for users to validate the accuracy of the outputs and identify potential sources of error more effectively. By breaking down the AI model into interpretable layers, rather than the AI model operating as a "black box," users can gain a clearer understanding of how the model arrives at its predictions, instilling confidence in the decisions made based on the AI model's outputs. Additionally, in the event of a disruption, such as a security breach or incident, engineers can trace back the layer-specific responses and descriptors generated by the model to understand how the model arrived at its conclusions. By evaluating the layer-specific responses and descriptors, engineers can identify the root cause of security issues and implement targeted remediation measures, thereby improving the overall security posture and efficiency of the computing platforms. Further, the layered AI model mitigates concerns about regulation and guideline adherence by providing visibility into the factors considered and decisions made at each layer. By examining the layer-specific set of variables and descriptors, engineers can ensure that the AI model's assessments align with regulatory requirements and guidelines. Furthermore, using weights for each layer or ranking the layers allows the model to adjust its output according to the importance of each layer to the specific context.

The inventors have further developed an improved method and system for constructing a layered prompt for evaluating and assessing an AI model. The method involves obtaining a set of application domains for a pre-trained LLM, which will be used to generate responses to inputs. By mapping each application domain to specific guidelines, the method defines the operational boundaries for the LLM. The method determines a set of layers/dimensions associated with these guidelines. Each layer includes variables representing attributes identified within the guidelines. Using these layers, the method constructs a first test case based on a scenario derived from the initial set of layers. This first test case includes a layered prompt and an expected response, and is designed to test the operational boundaries defined by the guidelines. The method then evaluates the LLM by supplying the first layered prompt to the LLM and receiving the corresponding responses. By comparing the expected response to the actual responses from the LLM, the method dynamically constructs a second test case. This second test case is based on a subsequent set of layers and includes another layered prompt and expected response, aiming to further test the LLM's boundaries. The method executes the second test case and displays the results on a graphical user interface (GUI). This display includes a graphical representation showing how well the LLM meets the guidelines and the evaluations from both test cases.

In various implementations, by comparing the expected response from the first test case to the actual responses from the LLM, the system can generate an indicator of compliance with the guidelines. This indicator may reflect various aspects such as the specific layers of the layered prompt(s), their variables, or the weights assigned to each layer. Additionally, the graphical representation on the GUI can include binary indicators, categorical satisfaction levels, or probabilities of satisfaction. Further, each layer can be assigned a weight, and the system can generate an overall satisfaction score in accordance with these weights.

Using a layered multi-prompt approach, the system allows users to break down complex queries into manageable phases, with each prompt focusing on a specific aspect of the task, and thus offers the user a particular explanation for particular outcomes of the AI model. This multi-layered approach ensures that each constructed prompt is contextually relevant by considering the responses from the LLM in response to previously supplied prompts, allowing the LLM to process the information systematically and accurately. By dynamically modifying and generating new layers based on the responses from previous layers, rather than constructing prompts using a "black box" approach, the system can adapt to the evolving understanding of the LLM's behavior. This iterative process allows for continuous refinement of the prompts, ensuring that they remain contextually relevant and aligned with the specific requirements of the task. Each subsequent prompt builds on the information gathered from earlier layers, allowing the LLM to form a more nuanced understanding of the query.

Additionally, layered prompts improve the adaptability in evaluating and assessing LLMs by allowing for dynamic modification and continuous updating of the prompt structure. Unlike static prompts, which remain fixed and become quickly outdated in changing environments, layered prompts are designed to be flexible and responsive to new regulations, guidelines, and standards. By structuring the prompts into layers, each addressing specific aspects of the task and being modifiable based on incoming data, the system maintains the relevance and accuracy of the LLM's outputs. For example, if new regulations are introduced in the financial sector, the guidelines and standards layer can be updated to reflect these changes, and the prompt engineering module can integrate this updated layer into the existing prompt structure. This ensures that the LLM's responses adhere to the latest regulatory requirements and industry best practices.

Further, layered prompts improve the transparency in the decision-making process of LLMs by providing a structured and traceable framework for evaluating and assessing the LLMs' generated responses. Unlike traditional prompt engineering, which often results in a black-box understanding of the LLM since it is difficult to understand how specific outputs were derived, layered prompts decompose the decision-making process into distinct phases. Each layer within the prompt addresses a specific aspect of the task, ensuring that the rationale behind the LLM's responses can be systematically evaluated. For instance, in the context of regulatory compliance in finance, an LLM may be used to generate recommendations for investment strategies. Traditional single-prompt methods would result in the LLM generating these recommendations without revealing the underlying reasoning process, making it difficult to ensure that all regulatory requirements are met. With layered prompts, the process is divided into multiple stages, each layer focusing on different regulatory aspects. One layer might assess the risk profile of an investment, while another might evaluate the compliance of the investment with current financial regulations. By delineating these stages, the layered prompt system enables auditors and compliance officers to trace each decision of the LLM back to its specific regulatory considerations to ensure that the LLM's recommendations align with legal requirements.

In the following description, for the purposes of explanation, numerous specific details are set forth in order to provide a thorough understanding of the implantations of the present technology. It will be apparent, however, to one skilled in the art that implementation of the present technology can practiced without some of these specific details.

While the present technology is described in detail for use with LLMs, one of skill in the art would understand that the same techniques could be applied, with appropriate modifications, to improve the prompt engineering to other generative models (e.g., GenAI, generative AI, GAI), making the technology a valuable tool for diverse applications beyond LLMs. Other generative models are equally appropriate after appropriate modifications.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Constructing a Layered AI Model

FIG. 1 is an illustrative diagram of an example environment 100 of a layered artificial intelligence (AI) model, in accordance with some implementations of the present technology. Environment 100 includes a command set 102, AI model 104, layers 106a-106n within the AI model 104, and overall response 108. AI model 104 is implemented using components of example computer system 1200 illustrated and described in more detail with reference to FIG. 12. Likewise, implementations of example environment 100 can include different and/or additional components or can be connected in different ways.

The command set 102 operates as an input into the AI model 104. The command set 102 consists of a set of instructions or queries directed toward the AI model, which can encompass a wide range of tasks or inquiries, depending on the specific application or use case of the AI model. For example, in a cybersecurity context, command set 102 can be a prompt that asks the AI model to predict whether an attempt to access a certain application is authentic. Command set 102, in a cybersecurity context, can range from routine security assessments and threat intelligence gathering to proactive threat hunting, incident response coordination, and remediation efforts. In another example, in a financial analysis setting, the command set 102 can consist of risk assessments for candidate loan applications. In some implementations, the command set can be structured in a standardized format to ensure consistency and interoperability across different interactions with the AI model.

Within the AI model 104 are multiple layers (e.g., layers 106a-n). Each layer 106a-n corresponds to a specific aspect or domain context relevant to the decision-making process within the AI model 104. Layers 106a-n can include specialized knowledge and logic tailored to specific domains or areas of expertise. For example, one layer can focus on demographic information, while another layer can analyze financial data or market trends. The particular layers 106a-n within the AI model 104 can incorporate relevant data sources, algorithms, and/or analytical techniques tailored to the specific context the particular addresses. The layers 106a-n can identify patterns and/or generate predictions or recommendations that contribute to the overall decision-making process of the AI model 104. In some implementations, layers 106a-n are augmented with additional capabilities such as machine learning (ML) models, natural language processing (NPL) algorithms, or domain-specific heuristics to enhance their effectiveness. Layers 106a-n can evolve over time in response to changing regulations or guidelines, emerging trends, or new insights identified by the AI model. Layers 106a-n within the AI model can also be versioned to accommodate evolving requirements and regulations. For instance, layers 106a-n tailored towards privacy regulations that apply in 2024 may differ significantly from those anticipated for 2030. By versioning layers 106a-n, the system can maintain and apply distinct sets of rules and guidelines that correspond to different regulatory frameworks over time.

The layers 106a-n within the AI model can include the overall layer's 108a-n function, as well as metrics on the logic used within the layers 106a-n (e.g., layer-specific model logic), such as weights, biases, and activation functions, that affects how the model processes information and arrives at its conclusions. Weights determine the importance of each input, biases adjust the output along certain dimensions, and activation functions control the signal propagation through the network. Further methods of using layers 106a-n to generate responses for the AI model 104 and modifying layers are discussed with reference to FIG. 2.

Example layers include, but are not limited to, demographics current financial data (e.g., credit score), financial history, market conditions corporate strategy (e.g., tactical, strategic), geopolitical and systemic implications (e.g., tactical, strategic), corporate conditions, complexity of financial product, loss risk of the product, length of investment, buyout options, complexity of transaction, financial data and history of social graph, employment history, product applicability, operational and/or execution costs, and/or regulatory guidelines (e.g., regional, global).

For example, in a cybersecurity context, one layer can focus on network traffic analysis, and employ algorithms and techniques to identify anomalous patterns within network traffic that are indicative of potential cyber threats or malicious activities. A different layer can focus on regulatory compliance by ensuring that the AI model complies with cybersecurity jurisdictional and/or organizational regulations, such as regulations directed towards data privacy. In another example, in a financial context, one layer can focus on data quality, another layer can focus on financial regulatory compliance, a third layer can focus on identifying bias, a fourth layer can be focused on uncertainty, and so on.

Layers 106a-n and their functions within the AI model can be versioned and stored along with metadata to enable reusability of the layers 106a-n and facilitate performance comparisons between the versioned layers. Each versioned layer can include metadata that captures the specific configurations, such as weights, biases, activation functions, and the regulatory or contextual parameters the versioned layer addressed. This approach enables the layers 106a-n to be reused across different models and applications.

As the command set 102 is processed through the AI model 104, the command set 102 traverses through each layer 106a-n sequentially, with each layer 106a-n constructing layer-specific model logic (which can be non-uniform) to generate layer-specific responses. For example, one layer can use signature-based detection methods to identify known malware threats, while another layer can use anomaly detection algorithms to detect suspicious behavior indicative of potential cyber-attacks. Layer-specific responses generated by each layer can provide actionable insights specific to a particular layer to enhance cybersecurity posture and/or resilience. Examples of using layer-specific model logic to generate layer-specific responses are discussed in further detail with reference to FIG. 2.

In some implementations, the layer-specific responses can include alerts, notifications, risk assessments, and/or recommended mitigation strategies tailored to the specific context addressed by each layer. For example, a layer specializing in network traffic analysis can generate a response highlighting anomalous patterns indicative of a potential distributed denial-of-service (DDOS) attack, along with recommendations for implementing traffic filtering measures or deploying intrusion prevention systems (IPS) to mitigate the threat.

The layer-specific responses from all layers 106a-n are aggregated to produce an overall response 108. The overall response 108 includes the collective decisions generated by the AI model, synthesized from the individual contributions of each layer 106a-n. The overall response provides a holistic perspective of the layers 106a-n on the command set 102. Methods of aggregating the layer-specific responses from all layers 106a-n are discussed in further detail with reference to FIG. 2.

Figure 2:
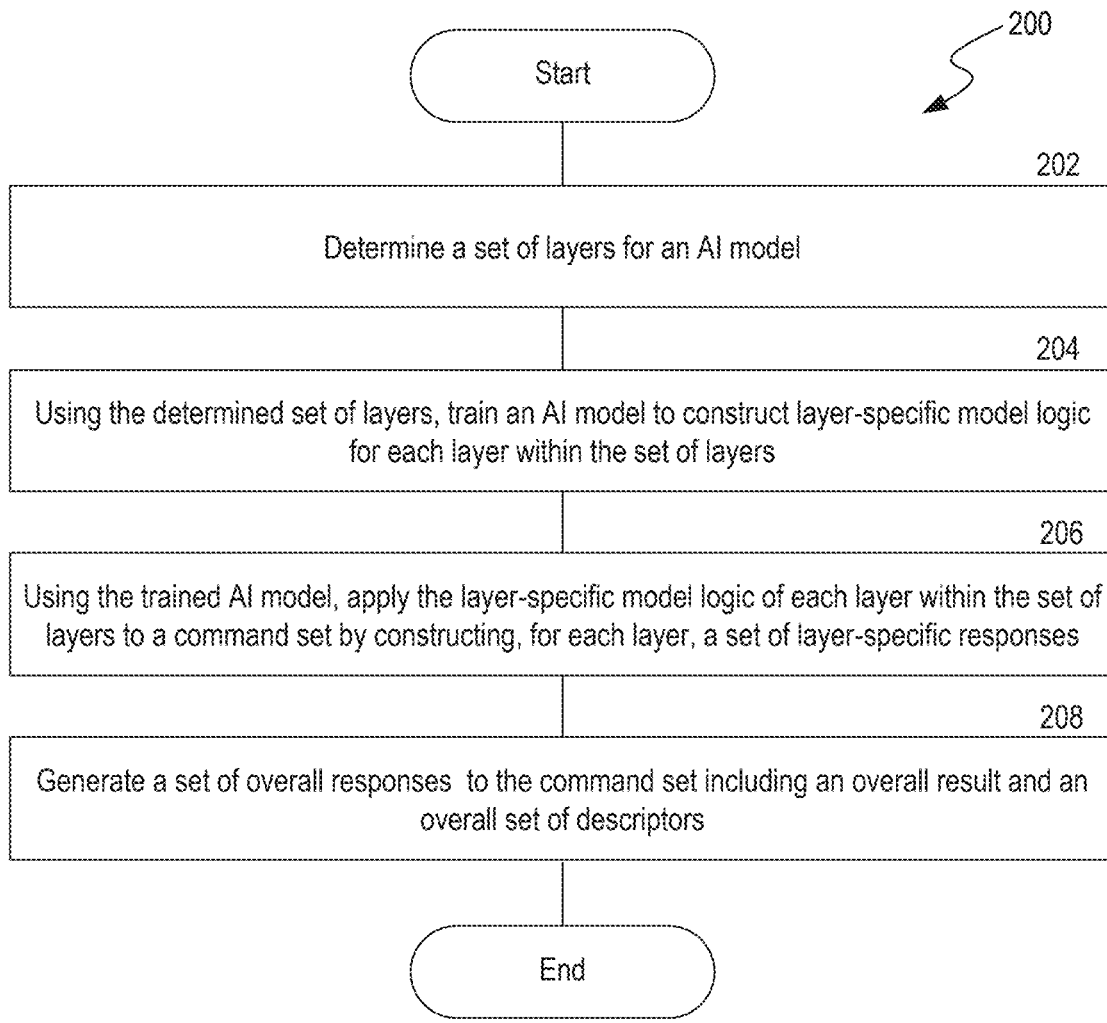
FIG. 2 is a flow diagram illustrating a process of constructing a layered AI model, in accordance with some implementations of the present technology.

FIG. 2 is a flow diagram illustrating a process 200 of constructing a layered AI model, in accordance with some implementations of the present technology. In some implementations, the process 200 is performed by components of example computer system 1200 illustrated and described in more detail with reference to FIG. 12. Particular entities, for example, AI model 104, are illustrated and described in more detail with reference to FIG. 1. Likewise, implementations can include different and/or additional steps or can perform the steps in different orders.

At act 202, the system determines a set of layers for an AI model. Each layer within the set of layers relates to a specific context associated with the AI model (e.g., cybersecurity, finance, healthcare). The layers are the same as or similar to layers 106a-n illustrated and described with reference to FIG. 1.

Contexts within each layer of the AI model can be stored as vectors (e.g., described further with reference to FIG. 5) and/or structured data, to allow the layers to be reused and easily explained. Each layer's context can include metadata detailing its purpose, including a date/time stamp, version number, and other relevant information. This metadata allows for transparency and traceability, facilitating easier audits and updates. Additionally, the context can store necessary data elements, such as Shapley values, used by the system to understand the contributions of different inputs to the layer's decisions. The context can also include the layer's mathematical functions, such as weights, biases, and activation functions, to provide an indicator of the layer-specific model logic employed. In some implementations, the context associated with the AI model is the combined contexts of these individual layers processed through a mathematical function.

In some implementations, contexts can be derived from various sources such as the Common Vulnerabilities and Exposures (CVE) database (in the context of cybersecurity), inputted data, a knowledge base, and structured data formats. Additionally, historical data such as data on previous attacks (in the context of cybersecurity), and stored contexts from earlier analyses can be used to determine the context of an AI model. Contexts can also be retrieved using vector grouping, which allows for the clustering and identifying relevant patterns and relationships within the data used in the AI model. Vector grouping, also known as clustering, aims to group similar data points based on their proximity or similarity in the multidimensional space. By clustering data points that share common characteristics or exhibit similar patterns, vector grouping helps identify meaningful relationships and patterns within the data and enables the AI model to recognize distinct contexts or themes present in the data. For example, vector grouping could identify clusters of data points representing different types of cyber threats, attack vectors, or user behaviors and infer that cybersecurity is a context for the AI model.

Each layer within the set of layers includes a set of variables associated with the specific context of the corresponding layer. Each variable represents an attribute identified within the specific context of the corresponding layer. Variables can take various forms depending on the nature of the data and the objectives of the AI model. For example, variables can represent numerical values, categorical attributes, textual information, and/or data structures. In a predictive modeling task, variables can include demographic attributes such as age, gender, and income level, as well as behavioral attributes such as purchasing history and online activity. In a natural language processing (NLP) task, variables can include words, phrases, or sentences extracted from text data, along with associated linguistic features such as part-of-speech tags and sentiment scores. For example, in a layer whose domain context relates to analyzing anomalies in network traffic, variables can include source IP address, destination IP address, packet size, and/or port number.

In some implementations, variables can be text, image, audio, video and/or other computer-ingestible format. For variables that are not text (e.g., image, audio, and/or video), the variables can first be transformed into a universal format such as text prior to processing. Optical character recognition (OCR) can be used for images containing text, and speech-to-text algorithms can be used for audio inputs. The text can then be analyzed and structured into variables for the corresponding layer(s) of the AI model to use. In some implementations, in cases where transforming to text is not feasible or desirable, the system can use vector comparisons to handle non-text variables directly. For example, images and audio files can be converted into numerical vectors through feature extraction techniques (e.g., by using Convolutional Neural Networks (CNNs) for images and using Mel-Frequency Cepstral Coefficients (MFCCs) for audio files). The vectors represent the corresponding characteristics of the input data (e.g., edges, texture, or shapes of the image, or the spectral features of the audio file).

Furthermore, the layers and/or variables within the layers can be tailored specifically to the domain of the AI model, or be used universally. For example, tailored layers in a cybersecurity AI model can include network traffic anomalies, user authentication, and threat intelligence, each providing insights into potential security threats and vulnerabilities. Alternatively, universal layers that can be applied to AI models regardless of the AI model's context could be used to analyze bias and data quality.

In some implementations, the set of layers is determined by a received input (e.g., through an interface by a user). The received input can indicate the specific contexts associated with the AI model. In some implementations, the set of layers and/or variables are dynamically determined by an ML model. The ML model can identify the specific contexts associated with the AI model. Layers and/or variables within AI models can include features generated through data transformation or feature engineering techniques. The derived layers and/or variables can capture relationships or patterns within the data that are not directly observable in the raw input or structured metadata of the input. For example, the ML model can receive the AI model's input training data. Using the gathered data, the ML model captures relationships or patterns within the data, and flags the relationships or patterns as potential layers or variables. Clustering algorithms can be applied to identify patterns and distinct subgroups (e.g., contexts) within the dataset. Further methods of training an ML model are discussed in further detail with reference to FIG. 4.

For example, the ML model analyzes the data to and identifies a context of the AI model to be overall related to customer satisfaction by recognizing the data to indicate the level of satisfaction, and further identifies potential layers to determine customer satisfaction, such as sentiment polarity, intensity, or topic relevance. The ML model can additionally determine variables for corresponding layers by identifying frequent words or phrases associated with positive or negative sentiments, as well as syntactic structures that convey sentiment.

In some implementations, the system receives an indicator of a type of application associated with the AI model. This indicator serves as a signal or cue that informs the system about the specific domain or context in which the AI model will be deployed. The indicator can take various forms, such as a user-defined parameter, a metadata tag, or a configuration setting, depending on the implementation. Upon receiving the indicator, the system proceeds to identify a relevant set of layers associated with the type of application defining one or more operation boundaries of the AI model. For example, the system can map the indicator to a predefined set of layers that are relevant in addressing the requirements and objectives of the identified application type. The identification process can be based on predefined mappings or rules.

In some implementations, instead of relying on automated mapping or inference based on the application type indicator, users can manually select and specify the desired layers for the AI model. This manual configuration process provides users with greater flexibility and control over the composition and customization of the AI model, allowing them to tailor it to their specific preferences. Once identified, the system can obtain the relevant set of layers, via an Application Programming Interface (API).

In some implementations, the system receives an input containing an overall set of layers and an overall set of variables for each layer. Using an ML model, the system compares the specific contexts within the overall set of layers with the specific contexts related to the AI model. The system extracts the AI model-specific set of layers from the overall set of layers using the comparison. For example, an ML algorithm can evaluate historical data, user feedback, or performance metrics to identify and adapt the set of layers based on observed patterns or trends. Relevant features or attributes can be extracted from the AI model's input data to capture patterns or signals indicative of the effectiveness of different layers. Feature extraction techniques can include statistical analysis, dimensionality reduction, or domain-specific methods tailored to the characteristics of the data. ML models used in determining the relevant layers and variables using the overall set of layers and variables can include supervised learning models, unsupervised learning models, semi-supervised learning models, and/or reinforcement learning models. Examples of machine learning models suitable for use with the present technology are discussed in further detail with reference to FIG. 3.

If the ML model is provided with labeled data as the training data and given an overall context (e.g., cybersecurity), the ML model can, in some implementations, filter the attributes within the training data of the AI model and identify the most informative attributes (e.g., certain patterns). For example, attributes such as time stamps and user IDs may be more informative in the cybersecurity context than attributes such as pet ownership status. Correlation, mutual information, and/or significance tests can be used to rank the attributes based on the discriminatory power. Correlation analysis measures the strength and direction of the linear relationship between each attribute and the target variable (in this case, the presence of a layer). Attributes with higher correlation coefficients are considered more relevant for detecting a layer. For example, a correlation coefficient of +1 or greater indicates a strong positive linear relationship. Mutual information estimation quantifies the amount of information shared between each attribute and the target variable, identifying attributes with higher mutual information as more informative for layer detection. Once the attributes are ranked based on discriminatory power, the system selects only the most informative features to reduce the dimensionality of the dataset. By selecting only the most informative features, filter methods help reduce the dimensionality of the dataset (e.g., by only including layers and variables that are determinative of the AI model's prediction), leading to faster processing times and improved model performance.

If the ML model is provided with unlabeled data, the ML model can use unsupervised learning techniques to identify patterns and structures within the training data. For example, clustering algorithms, which group similar instances based on shared characteristics, can be used to identify clusters of text passages that exhibit similar patterns of a potential layer. Clustering algorithms such as k-means or hierarchical clustering can be applied to the unlabeled text data to group instances that share common attributes or features. The algorithms partition the data into clusters such that instances within the same cluster are more similar to each other than to instances in other clusters. By examining the contents of each cluster, the ML model can identify patterns indicative of a domain context, such as the frequent occurrence of certain words or phrases. Additionally, topic modeling, which identifies underlying themes or topics present in the text data can be used by the ML model to automatically identify topics within a corpus of text documents (e.g., if the regulations or guidelines that the AI model is subject to are given as a corpus of text documents). Each topic represents a distribution over words, and the data is assumed to be generated from a mixture of the topics. By analyzing the topics inferred from the unlabeled data, the ML model can gain insights into the underlying themes or subjects that can be associated with a particular domain context.

For example, one or more of the layers within the set of layers can relate to the quality of input data. The corresponding set of variables can be defined to capture relevant attributes or features associated with the quality of input data. These variables serve as indicators or metrics that inform the AI model about the characteristics of the input data and its suitability for analysis. Examples of quality-related variables can include the author associated with the input data, the timestamp indicating when the data was collected or modified, the location from which the data originated, the presence or absence of structured metadata, and/or the presence of outliers or anomalies in the data distribution. In some implementations, the system establishes criteria or thresholds for identifying outliers or anomalies through predetermined rules. For example, in a dataset input to the AI model that includes a series of temperature readings collected from various weather stations over a period of time, if most of the temperature readings fall within a range of 15 to 25 degrees Celsius, a reading of 50 degrees Celsius, which is significantly higher than the usual range, can be considered an outlier because the data deviates substantially from the expected pattern of temperature readings in the dataset. In another example, if entries in the input dataset are consistently missing metadata, the data quality layer can identify and flag the instances and, for example, return an output stating that the user should provide a better quality dataset, or that the output given has a low confidence score due to the poor quality of the dataset.

In a further example, one or more of the layers within the set of layers can relate to attempts to access data. These layers analyze access events and identify patterns or anomalies indicative of potential security breaches or unauthorized access attempts. For example, a layer can focus on analyzing login attempts to a system or application, while another layer can monitor API calls or file access events. Examples of access-related variables can include the author associated with the access attempt (e.g., user ID or IP address), the timestamp indicating when the attempt occurred, the location from which the attempt originated, the presence of authorization or permissions granted for the attempt, information about previous unsuccessful attempts, and/or the frequency of access attempts over a specific time period.

In some implementations, the AI model can be constructed to identify new layer(s) within the command set. For example, ML algorithms can be applied to analyze historical command data and identify recurring themes or topics that warrant the creation of new layers. The ML algorithms can use clustering or topic modeling to identify recurring themes or patterns within the command data. For example, the ML algorithms can detect frequent commands related to user authentication, data access, or system configuration changes. The system can iteratively update the set of layers by adding the new layer(s) to the set of layers. For instance, if the ML algorithm reveals a pattern of commands related to user access control, the system can create a new layer dedicated to user authentication and authorization processes.

In act 204, using the determined set of layers, the system trains an AI model to construct layer-specific model logic for each layer within the set of layers. The layer-specific model logic generates, in response to an input, a layer-specific result using the corresponding set of variables of the layer. In some implementations, each layer-specific model logic is constructed by training the AI model on a master dataset, which includes the corresponding set of variables of each layer. For example, the layer-specific model logic can be an algebraic equation that aggregates the variables within the layer to generate a layer-specific response (e.g., "Variable_1+2 (Variable_2)+0.5 (Variable_3)=Layer-Specific_Response").

In some implementations, to construct the layer-specific model logic for each layer, the system can transform the layers of AI model using a rule-based engine. For example, the system can project/map the layers and/or variables of the AI model onto parameters that can operate within an AI model. Each layer-specific model logic in an AI model performs specific computations that contribute to the overall decision-making process. The rule-based engine maps each layer to a particular set of computations. For example, the rule-based engine can map a layer's task of identifying part-of-speech tags in text to specific neural network weights that are responsible for recognizing syntactic patterns. Similarly, a layer focused on sentiment analysis can be mapped to parameters that detect positive or negative word usage based on historical data.

In some implementations, the training data is labeled data. For example, a labeled dataset for detecting unauthorized attempts can include words or phrases labeled as either "authorized" or "non-authorized" based on whether a user was unauthorized. In some implementations, the training data is unlabeled data. Unlabeled data lacks explicit annotations and requires the model to infer patterns and structures independently. For example, unlabeled data can include the metadata associated with the attempt (e.g., timestamps, author), but without explicit annotations indicating which attempts are authorized or unauthorized.

For data privacy reasons, synthetic data can be generated and used as the training dataset for different layers within the layered AI model, either as a master dataset that all the layers are trained on, or the dataset that one or more layers are trained on. Generative adversarial networks (GANs), which consist of two neural networks—a generator and a discriminator—can be trained iteratively to generate realistic-looking data samples. For example, the generator network creates synthetic data samples from random noise or latent vectors. The generated samples are fed into the discriminator network, along with real data samples from the training dataset. The discriminator distinguishes between real and synthetic data samples. As the training progresses, both networks (the generator and the discriminator) engage in a competitive process where the generator aims to produce increasingly realistic samples, while the discriminator becomes more adept at distinguishing between real and synthetic data. Through the iterative process, the generator network learns to generate synthetic data that closely matches the statistical properties and distribution of the real data. This enables the creation of synthetic data samples that exhibit similar patterns, features, and characteristics as the original dataset, without directly exposing sensitive information or violating privacy constraints. The system constructs one or more layer-specific model logics of the AI model using the synthetic data.

In some implementations, the layer-specific model logic constructed by the AI model is generated based on a complexity of the set of variables derived from the specific context of the layer. Complexity can be determined by various factors, such as the number of distinct values, the range of possible values, or the degree of uncertainty associated with the variable. For example, a variable representing the presence of a specific threat indicator can be considered less complex than a variable representing the statistical distribution of network traffic patterns. The AI model analyzes the set of variables within each layer to determine their relative complexity. After determining the complexity of the layer, the layer-specific model logic evaluates each variable in sequence. For example, subsequently used variables in the layer-specific model logic can be progressively more complex than preceding variables. This way, the AI model can prioritize simpler variables before evaluating more complex variables to conserve computing resources. For example, if a threshold condition needed to evaluate more complex variables are not met, the layer-specific model logic does not need to evaluate the more complex variables since those variables would not be determinative of the layer-specific outcome.

In some implementations, the number of layers used in constructing the AI model is determined based on computational complexity, which is associated with time (e.g., sequence length, dimensionality) and space (e.g., number of parameters, memory required, number of layers). Sequence length refers to the length of input or output sequences processed by the AI model. Longer sequences require more computation, as each token or word in the sequence must be processed and contextualized within the entire sequence. A longer sequence can increase the complexity of computation due to the longer time required for training and inference. Dimensionality refers to the size of the input and output vectors, representing the data processed by the AI model. Higher dimensionality means each data point is represented with more features, increasing the complexity of the computations the AI model performs. The number of parameters refers to the total count of weights and biases in the model, which impacts the model's ability to learn and generalize from data. Greater parameters can mean more complex and potentially more accurate models, but greater parameters also require increased memory and computational resources to manage. Memory required includes the amount of RAM or other memory resources needed to store the model parameters and intermediate computation results during training and inference. As the AI model size grows, so does the memory requirement, which can be a limiting factor in deploying large models on hardware with limited resources.

The number of layers in an AI model affects both time and space complexity. Each layer adds additional computation and storage requirements, as the data must pass through multiple transformations and computations from input to output. More layers generally allow the model to capture more complex patterns and dependencies in the data, but more layers also increase the overall computational load and memory usage.

In act 206, using the trained AI model, the system applies the layer-specific model logic of each layer within the set of layers on a command set. The system passes the command set (e.g., command set 102) through the AI model, where each layer processes the command set independently using the layer's specific set of variables and learned parameters. The layer-specific model logic determines how the AI model interprets and responds to the command set within the context of each layer.

In some implementations, the output of one layer can operate as an input for subsequent layers to allow the AI model to leverage the insights and decisions generated at each layer to inform subsequent steps. For example, one layer can focus on data quality and output flagged instances of unusual activity (e.g., anomalous timestamp or location), and the system can pass the output to a subsequent layer directed to anomaly detection. The flagged instances from the data quality layer can be input into the anomaly detection layer, where more complex algorithms can be used to further evaluate the flagged data points in greater detail to search for deviations from normal behavior that may signify a security threat. The output of this layer may consist of, for example, risk scores assigned to each flagged instance, providing a deeper level of insight into potential security breaches.

The system generates, for each layer, a set of layer-specific responses that can include (1) the layer-specific result in accordance with the application of the layer-specific model logic of each layer within the set of layers, and/or (2) a layer-specific set of descriptors indicating the corresponding layer-specific model logic to generate the layer-specific result. The layer-specific result represents the output or prediction generated by the AI model within the domain or context defined by the specific layer. The layer-specific set of descriptors provides transparency and interpretability in the decision-making process of the AI model. The layer-specific descriptors can include information about the variables, algorithms, or methodologies employed within each layer to arrive at the layer-specific result. For example, in the context of a command set aimed at determining whether an access attempt was authorized, the layer-specific result can be "non-authorized." Correspondingly, the layer-specific set of descriptors can be "incorrect password," which explains why the user was classified as non-authorized. In some implementations, in response to reaching a non-compliance threshold, the system is prevented from generating additional sets of layer-specific responses.

In act 208, the system generates a set of overall responses to the command set including an overall result and an overall set of descriptors. The overall result for each layer can include a binary indicator of one or more variables in corresponding set of variables, a category of the layer-specific response, and/or a probability of the layer-specific response. The overall set of descriptors is associated with a series of the layer-specific set of descriptors to generate the overall result. The overall set of descriptors can indicate the set of layers, the corresponding sets of variables, and/or the weights used for each layer.

To generate the overall result, the system aggregates the layer-specific results from each layer using weights for each layer. In some implementations, the weights are manually defined and predetermined by users. In some implementations, the system uses ML algorithms to determine the weights for each layer. For example, the system can analyze historical data to identify the most effective weightings that maximize the accuracy or reliability of the AI model's predictions. The system can use techniques such as gradient descent, genetic algorithms, or Bayesian optimization to search for the most effective weightings. Gradient descent iteratively adjusts the weights of the layers to minimize a loss function, which measures the difference between the predicted outputs and the actual targets in the training data. By computing the gradient of the loss function with respect to the weights, gradient descent determines the direction and magnitude of weight updates that reduce the loss, gradually converging towards a more effective set of weights. Additionally, Bayesian optimization iteratively selects candidate points in the weight space to evaluate, and balances exploration (searching for promising regions) and exploitation (exploiting regions with high predicted performance). Through this process, Bayesian optimization efficiently converges towards the optimal set of weights by sampling the weight space.

In some implementations, the weights can be determined through confidence scores of each layer-specific response. The system generates confidence scores, via the AI model, for the corresponding layer-specific response. The confidence scores represent a reliability of the layer-specific response, and the system dynamically switches between one or more layers within the set of layers based on the generated confidence scores. For example, layers with higher confidence scores in its layer-specific response are weighted more than layers with lower confidence scores in its layer-specific response.

Once the layer-specific results and their corresponding weights are determined, the system proceeds to aggregate the layer-specific results into an overall result to the command set. The aggregation process can involve mathematical operations such as weighted averaging, summation, or techniques tailored to the specific requirements of the AI model and its application domain. For example, a mathematical function aggregating the layer-specific results can include the layer's bias, weights for particular layer-specific results, and/or other functions used by the layers for the layer-specific results.

Using the generated overall result, the system aggregates the layer-specific set of descriptors that are associated with the set(s) of descriptors used to generate the overall result. In some implementations, only the sets of descriptors that support this overall result are included in the overall set of descriptors. For example, if the overall result is binary (e.g., "AUTHORIZED"), only the descriptors for the layers which support this result (e.g., non-suspicious frequency or location) are included in the overall set of descriptors. Alternatively, all of the sets of descriptors for all of the layers used in the prediction are included in the overall set of descriptors.

Based on the aggregation, the system generates a set of overall responses to the command set including an overall result and an overall set of descriptors. The overall set of descriptors is associated with a series of the layer-specific set of descriptors to generate the overall result. The overall set of descriptors can indicate the set of layers, the corresponding sets of variables, and/or the predetermined weights used for each layer. The overall result for each layer can include a binary indicator of one or more variables in corresponding set of variables, a category of the layer-specific response, and/or a probability of the layer-specific response.

In some implementations, the system uses the overall responses, to generate a set of actions (e.g., recommendations, corrective actions) to adjust the overall result to a desired result. The actions aim to address any identified issues or deficiencies. For example, if certain layers fail to meet the desired criteria due to specific attribute values or patterns, the actions can suggest adjustments to those attributes or modifications to the underlying processes. For example, a suggested action can be to weigh certain layers differently if new regulations or guidelines are given to the AI model.

The system can use an ML model to learn from historical data and past decisions to identify patterns and trends that indicate a set of actions the AI model can take to comply with the adjust the overall result to the desired result. By training on a dataset of past corrective actions and the outcomes, the machine learning models can predict the most effective recommendations for new cases. The set of actions can be automatically implemented as corrective actions by the system. For example, the system can receive user feedback related to deviations between the overall response of the AI model and desired response (e.g., feedback to stop using a certain layer/variable, or to add a new layer/variable). The system can iteratively adjust the set of layers and/or the layer-specific model logic to modify the overall response to the desired response. In some implementations, the system can tag relevant recommendations with attributes that help contextualize the relevant recommendations. The tags serve as markers that categorize and organize the recommendations based on predefined criteria, such as regulatory compliance and cybersecurity. The tags provide a structured representation of the recommendations and allow for easier retrieval, manipulation, and analysis of future command sets. The tags and associated metadata can be stored in a structured format, such as a database, where each recommendation is linked to the recommendation's corresponding tags.

For example, to construct a layered AI model, the system can first assess both the current and target requirements or guidelines (e.g., jurisdictional, organizational, AI-type specific). In a cybersecurity context, the system can identify existing cybersecurity protocols, frameworks, and technologies in use, alongside defining the desired cybersecurity posture aligned with organizational goals, regulatory standards, and industry best practices. The system can identify any gaps or deficiencies between the current and target requirements or guidelines. For example, in a cybersecurity context, gaps can encompass areas such as network security, data protection measures, access controls, and/or incident response protocols. Once the system understands the gaps, the system can prioritize the layers used within the AI model (e.g., by adjusting the weights of particular layers, by omitting or including certain layers). For example, layers can be ranked using mathematical functions based on their relevance to the organization's mission, legal and regulatory requirements, and/or risk management expectations. Moreover, the system can continuously monitor and track progress toward addressing the identified gaps to adjust the layers (e.g., by adjusting the weights of particular layers, by omitting or including certain layers) to reduce the identified gaps. For example, a mathematical function ranking the layers can include the bias for the layer, weights for particular layers, and other functions used by the layered AI model for the layer.

In some implementations, the gap can be identified using a machine learning model trained on labeled training data to learn patterns and relationships between features and guideline sources. For example, the labeled training data can be sets of guidelines based on the type of guideline they belong to (e.g., current guideline, target guideline). Using the trained model, the system can use the trained model to identify differences between the sets of guidelines by analyzing the features that contribute most to the classification decision (e.g., current guideline, target guideline) of each set of guidelines and identifying areas of divergence or overlap between the guidelines.

In some implementations, the system presents, via an interface (e.g., a graphical user interface (GUI)), human-readable summaries and/or detailed technical reports associated with the layered AI model. For example, the human-readable summaries can use AI-generated boilerplate text to indicate which layers and variables most significantly influenced the overall outcome to provide clear and concise explanations suitable for non-technical stakeholders. On the other hand, the detailed technical reports can include formulas and computational steps used in constructing the layered AI model, or a subset thereof if desired to offer in-depth insights into the model's workings for individuals such as technical users who desire a comprehensive understanding of the AI model's decision-making process.

Figure 3:
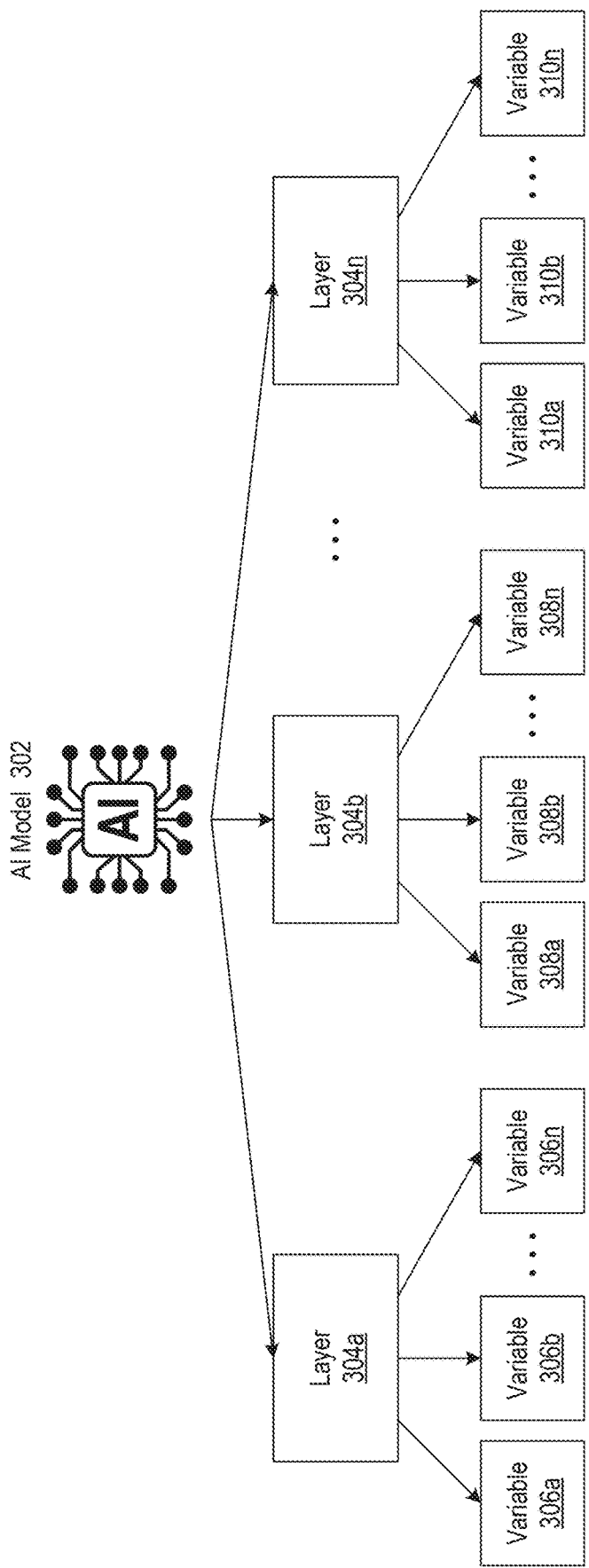
FIG. 3 is an illustrative diagram illustrating an example environment of variables within the layers of an AI model.

FIG. 3 is an illustrative diagram illustrating an example environment 300 of variables within the layers of an AI model. Environment 300 includes AI model 302, layers 304a-n, and variables 306a-n, 308a-n, 310a-n for each layer 304a-n. AI model 302 is the same as or similar to AI model 104 illustrated and described in more detail with reference to FIGS. 1, respectively. Layers 304a-n are the same as or similar to layers 306a-n illustrated and described in more detail with reference to FIG. 1. AI model 302 is implemented using components of example computer system 1200 illustrated and described in more detail with reference to FIG. 12. Likewise, implementations of example environment 300 can include different and/or additional components or can be connected in different ways.

Within each layer 304a-n, a set of variables 306a-n, 308a-n, 310a-n are defined to capture the key attributes and features associated with the respective domain of the corresponding layer 304a-n. For example, variables 306a-n correspond to layer 304a, variables 308a-n correspond to layer 304b, and variables 310a-n correspond to layer 304c. Each variable represents a parameter that contributes to the layer's analysis and decision-making process (e.g., layer-specific model logic). The variables 306a-n, 308a-n, 310a-n within each layer 304a-n can be organized and structured according to the variables' 306a-n, 308a-n, 310a-n relevance and importance to the corresponding layer's specific objectives. For example, variables associated with demographic information can include age, gender, and income level, while variables related to financial data can encompass account balances, transaction history, and credit scores.

Machine learning techniques can be applied to identify patterns or clusters within the layers and automatically categorize the layers into relevant variables based on similarity or relevance. Clustering algorithms, such as k-means or hierarchical clustering, can be used to identify variables based on the layer's content or features by partitioning the data underlying the layer into clusters, where the content within each cluster is more similar to each other than the content in different clusters. After clustering the content within layer, the system can assign each cluster to a relevant variable based on the cluster's content or theme. For example, if a cluster predominantly discusses gender, the cluster is assigned to a variable related to gender. Further methods of identifying variables within a layer are discussed with reference to FIG. 2.

In some implementations, deep learning techniques (e.g., recurrent neural networks (RNNs)) are used to learn latent representations of the layer and automatically cluster the layer based on learned representations. In some implementations, ensemble learning techniques, such as Random Forests or Gradient Boosting Machines (GBMs), are used to combine multiple clustering algorithms or models to improve the accuracy of the clustering process by aggregating the predictions of multiple base models to produce a final clustering solution, which can be more reliable than individual models alone.

Figure 4:
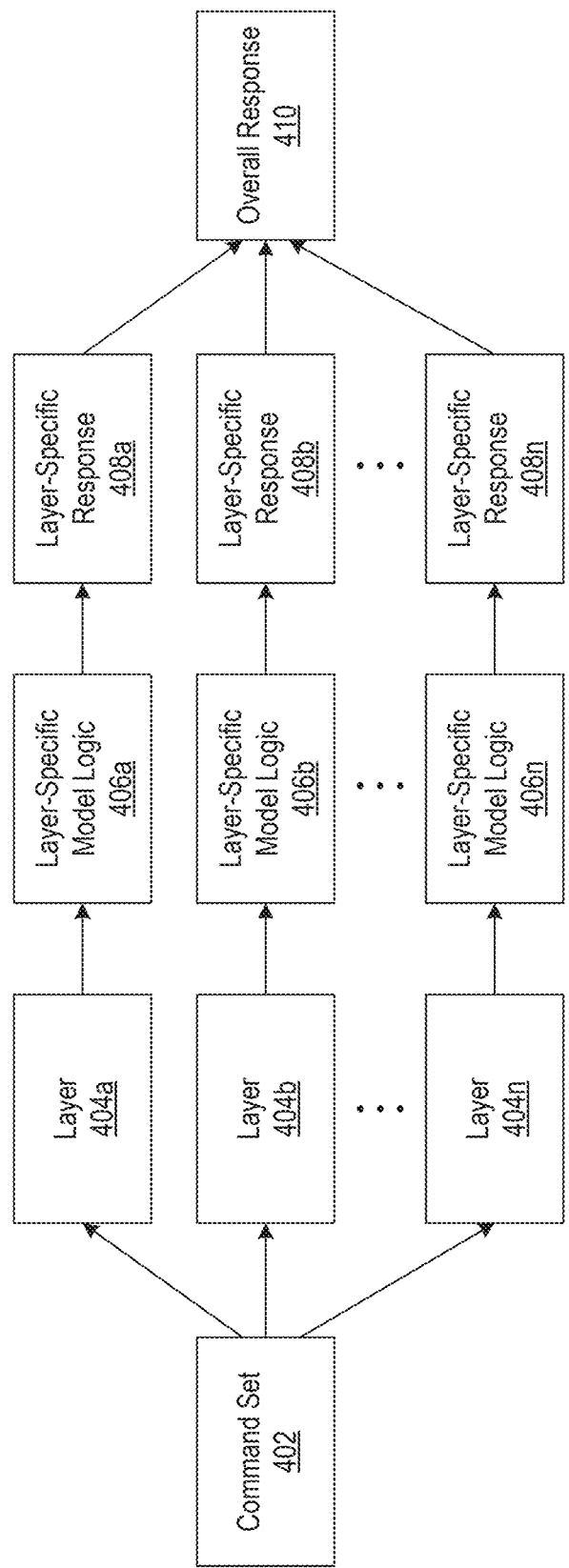
FIG. 4 is an illustrative diagram illustrating an example environment for generating an overall response for a received command set using a layered AI model.

FIG. 4 is an illustrative diagram illustrating an example environment 400 for generating an overall response for a received command set using a layered AI model. Environment 400 includes command set 402, layers 404a-n, layer-specific model logic 406a-n, layer-specific responses 408a-n, and overall response 410. Layers 404a-n are the same as or similar to layers 106a-n and layers 304a-n illustrated and described in more detail with reference to FIG. 1 and FIG. 3, respectively. Command set 402 is the same as or similar to command set 102 illustrated and described in more detail with reference to FIG. 1. Overall response 410 is the same as or similar to overall response 108 illustrated and described in more detail with reference to FIG. 1. Likewise, implementations of example environment 400 can include different and/or additional components or can be connected in different ways.

The command set 402 includes a set of instructions or queries directed towards the AI model. Further examples of a command set 102 are discussed with reference to FIG. 1. Multiple layers 404a-n can constitute the hierarchical structure or algorithm of the AI model in processing the command set 402. Within each layer 404a-n, layer-specific model logic 406a-n is defined to govern the processing of input data (e.g., command set 402) and generate layer-specific responses 408a-n. The layer-specific model logic 406a-n illustrates the algorithms and rules employed by each layer 404a-n to interpret and analyze the command set 402.

As the command set 402 traverses through each layer 404a-n, the layer-specific model logic 406a-n of each layer 1403a-n is applied to generate layer-specific responses 408a-n. The layer-specific responses 408a-n represent the individual contributions of each layer to the overall analysis, capturing the insights and decisions derived from the layer-specific processing. Methods of generating layer-specific responses using layer-specific model logic are further described in FIG. 3. The layer-specific responses 408a-n from all layers 404a-n can be aggregated to produce an overall response 410, which is a synthesized version of the collective insights and decisions generated by the different layers 404a-n. Methods of aggregating the layer-specific responses 408a-n from all layers 404a-n are further described in FIG. 2.

Figure 5:
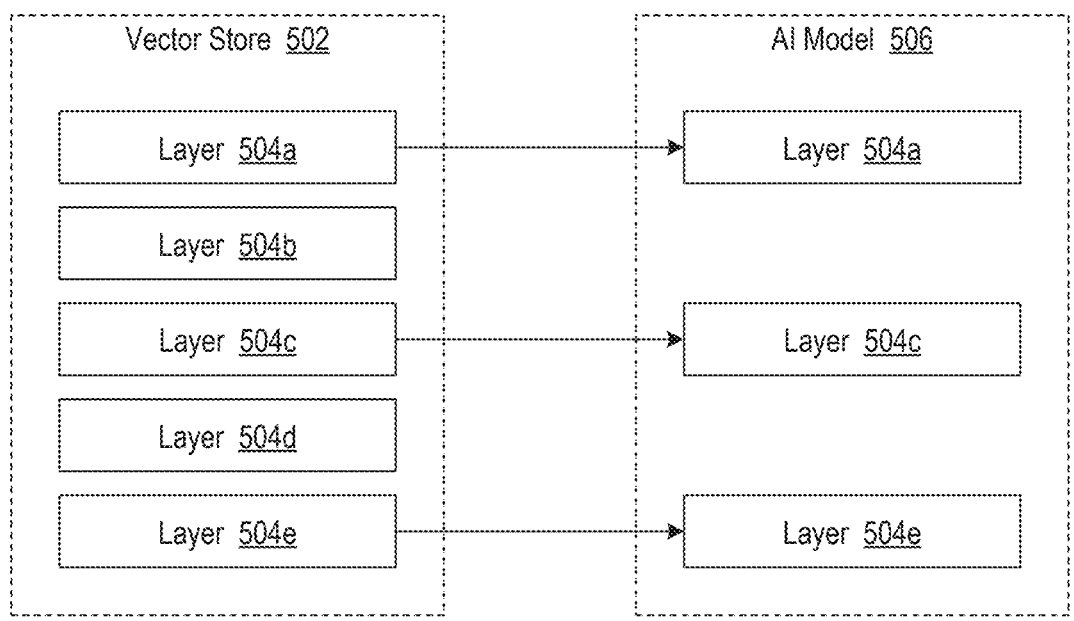
FIG. 5 is an illustrative diagram illustrating an example environment for constructing a layered AI model with layers from a vector store.

FIG. 5 is an illustrative diagram illustrating an example environment 500 for constructing a layered AI model with layers from a vector store. Environment 500 includes vector store 502, layers 504a-n within vector store 502, and AI model 506. AI model 506 is the same as or similar to AI model 104 and AI model 302 illustrated and described in more detail with reference to FIG. 1 and FIG. 3, respectively. Layers 504a-n are the same as or similar to layers 106a-n, layers 304a-n, and layers 404a-n illustrated and described in more detail with reference to FIG. 1, FIG. 3, and FIG. 4, respectively. AI model 506 is implemented using components of example computer system 1200 illustrated and described in more detail with reference to FIG. 12. Likewise, implementations of example environment 500 can include different and/or additional components or can be connected in different ways.

The vector store 502 is a repository for pre-existing layers that can be used in the construction of the AI model. The vector store 502 stores the layers 504a-n in a structured and accessible format (e.g., using distributed databases or NoSQL stores), which allows for efficient retrieval and utilization by the AI model 506. Contained within the vector store are multiple layers 504a-n. The layers 504a-n are stored in a structured manner within the vector store 502, with each layer 504a-n including algorithms and/or data relevant to specific domains or aspects of the decision-making process. In some implementations, only select layers from the vector store are used in the AI model 506. For example, in FIG. 5, only layers 504a, 504c, and 504e are selected to be included in the AI model 506. The AI model 506 integrates the selected layers 504a, 504c, and 504e from the vector store 502. By using layers from a vector store 502, constructing the AI model 506 becomes more streamlined, as it eliminates the need to develop or train new layers from scratch. Rather, existing layers that have been pre-designed and/or validated (e.g., adhering to regulations or guidelines) can be readily incorporated into the AI model, accelerating the development process.

In some implementations, the layers 504a-n are preprocessed to remove any irrelevant information, standardize the format, and/or organize the layers 504a-n into a structured database schema. Once the layers 504a-n are prepared, the layers 504a-n can be stored in a vector store 502 using distributed databases or NoSQL stores.

In some implementations, the layers 504a-n are stored using graph databases such as Neo4j™ or Amazon Neptune™. Graph databases represent data as nodes and edges, allowing for the modeling of relationships between layers 504a-n to demonstrate the interdependencies. In some implementations, the layers 504a-n are stored in a distributed file system such as Apache Hadoop™ or Google Cloud Storage™. These systems offer scalable storage for large volumes of data and support parallel processing and distributed computing. Layers 504a-n stored in a distributed file system can be accessed and processed by multiple nodes simultaneously, which allows for faster retrieval and analysis by the validation engine.

The vector store 502 can be stored in a cloud environment hosted by a cloud provider, or a self-hosted environment. In a cloud environment, the vector store 502 has the scalability of cloud services provided by platforms (e.g., AWS™, Azure™). Storing the vector store 502 in a cloud environment entails selecting the cloud service, provisioning resources dynamically through the provider's interface or APIs, and configuring networking components for secure communication. Cloud environments allow the vector store 502 to scale storage capacity without the need for manual intervention. As the demand for storage space grows, additional resources can be automatically provisioned to meet the increased workload. Additionally, cloud-based caching modules can be accessed from anywhere with an internet connection, providing convenient access to historical data for users across different locations or devices.

Conversely, in a self-hosted environment, the vector store 502 is stored on a private web server. Deploying the vector store 502 in a self-hosted environment entails setting up the server with the necessary hardware or virtual machines, installing an operating system, and storing the vector store 502. In a self-hosted environment, organizations have full control over the vector store 502, allowing organizations to implement customized security measures and compliance policies tailored to the organization's specific needs. For example, organizations in industries with strict data privacy and security regulations, such as finance institutions, can mitigate security risks by storing the vector store 502 in a self-hosted environment.

The AI model 506 accesses layers 504a-n from the vector store 502 to initiate the compliance assessment. The AI model 506 can establish a connection to the AI model 506 using appropriate APIs or database drivers. The connection allows the AI model 506 to query the vector store 502 and retrieve the relevant layers for the AI application under evaluation. Frequently accessed layers 504a-n are stored in memory, which allows the AI model 506 to reduce latency and improve response times for compliance assessment tasks.

Layered Multi-Prompt Engineering

Figure 6:
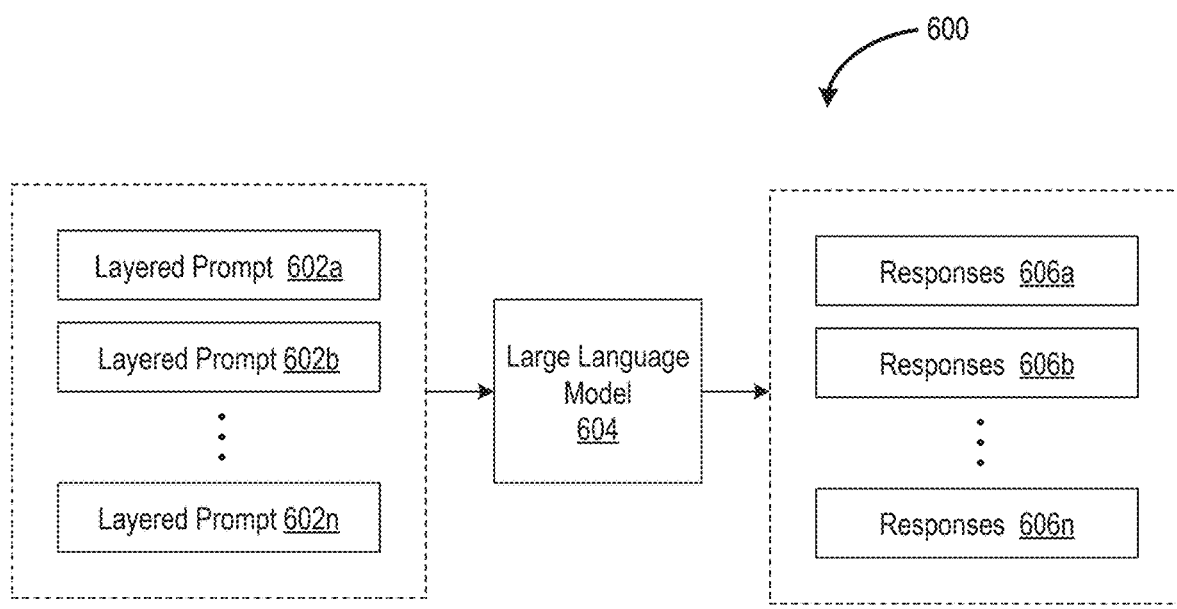
FIG. 6 is an illustrative diagram illustrating an example environment of a layered prompt that operates as an input in a Large Language Model (LLM), in accordance with some implementations of the present technology.

FIG. 6 is an illustrative diagram illustrating an example environment 600 of a layered prompt that operates as an input in a Large Language Model (LLM), in accordance with some implementations of the present technology. Environment 600 includes layered prompts 602a-n, LLM 604, and responses 606a-n. LLM 604 is implemented using components of example computer system 1200 illustrated and described in more detail with reference to FIG. 12. Likewise, implementations of example environment 600 can include different and/or additional components or can be connected in different ways.

Layered prompts 602a-n represent a series of structured inputs organized into multiple layers. Layered prompts 602a-n are inputs (e.g., command set or instruction set) to an LLM, which can be natural language inputs that include instructions to the LLM to generate a desired output. In some implementations, a computer system generates layered prompts 602a-n that are provided as input to the LLM 604 via the LLM's 604 API. In some implementations, layered prompt 602a-n includes one or more examples of the desired output, which provides the LLM 604 with additional information to enable the LLM 604 to generate output according to the desired output. Additionally or alternatively, the examples included in a layered prompt 602a-n provide inputs (e.g., example inputs) corresponding to/as can be expected to result in the desired outputs provided. A one-shot prompt refers to a prompt containing a singular example, providing the LLM with a single instance of input-output correspondence for reference. In contrast, a few-shot prompt encompasses multiple examples, offering the LLM several instances of input-output pairs to learn from and generalize patterns. On the other hand, a layered prompt 602a-n that includes no examples can be referred to as a zero-shot prompt.

Each layer within each of the layered prompts 602a-n focuses on a particular context of a guideline and addresses the particular context within the decision-making process of the LLM 604. Further examples of guidelines and the particular context of the guidelines are discussed with reference to FIG. 1. Further examples of layers are discussed with reference to layers 106a-n in FIG. 1. Using layered prompts allows for a more granular and interpretable understanding of how the LLM processes inputs and arrives at the LLM's outputs. Subsequently constructed layered prompts 602a-n can be dynamically modified based on contextual conditions and the values derived from preceding layers. Methods of dynamically modifying layered prompts 602a-n are discussed in further detail with reference to FIG. 9. By dynamically modifying layered prompts, the system ensures that layered prompts 602a-n are contextually tailored and relevant to the pre-trained LLM and adapt in accordance with the evolving understanding of the pre-trained LLM's decision making processes.

LLM 604 can process layered prompts 602a-n sequentially. LLM 604 can use a neural network to perform Natural Language Processing (NLP) tasks. LLM 604 is trained to model how words relate to each other in a textual sequence, based on probabilities. In some implementations, LLM 604 contains millions or billions of learned parameters. As non-limiting examples, LLM 604 can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. LLM 604 can also be used for chatbots (e.g., virtual assistants).

For example, because GPT-type language models tend to have a large number of parameters, these language models are considered LLMs (e.g., LLM 604). An example of a GPT-type LLM is GPT-3. GPT-3 is a type of GPT language model that has been trained (in an unsupervised manner) on a large corpus derived from documents available to the public online. GPT-3 has a very large number of learned parameters (e.g., hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that GPT-3 can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

As the LLM 604 interprets each layered prompt 602a-n, the LLM 604 generates responses 606a-n that correspond to the particular phase of reasoning addressed by the respective layer of each layered prompt 602a-n. The layered approach facilitates transparency in the LLM's 604 decision-making process, as each response 606a-n can be traced back to a specific layer of each layered prompt 602a-n.

Figure 7:
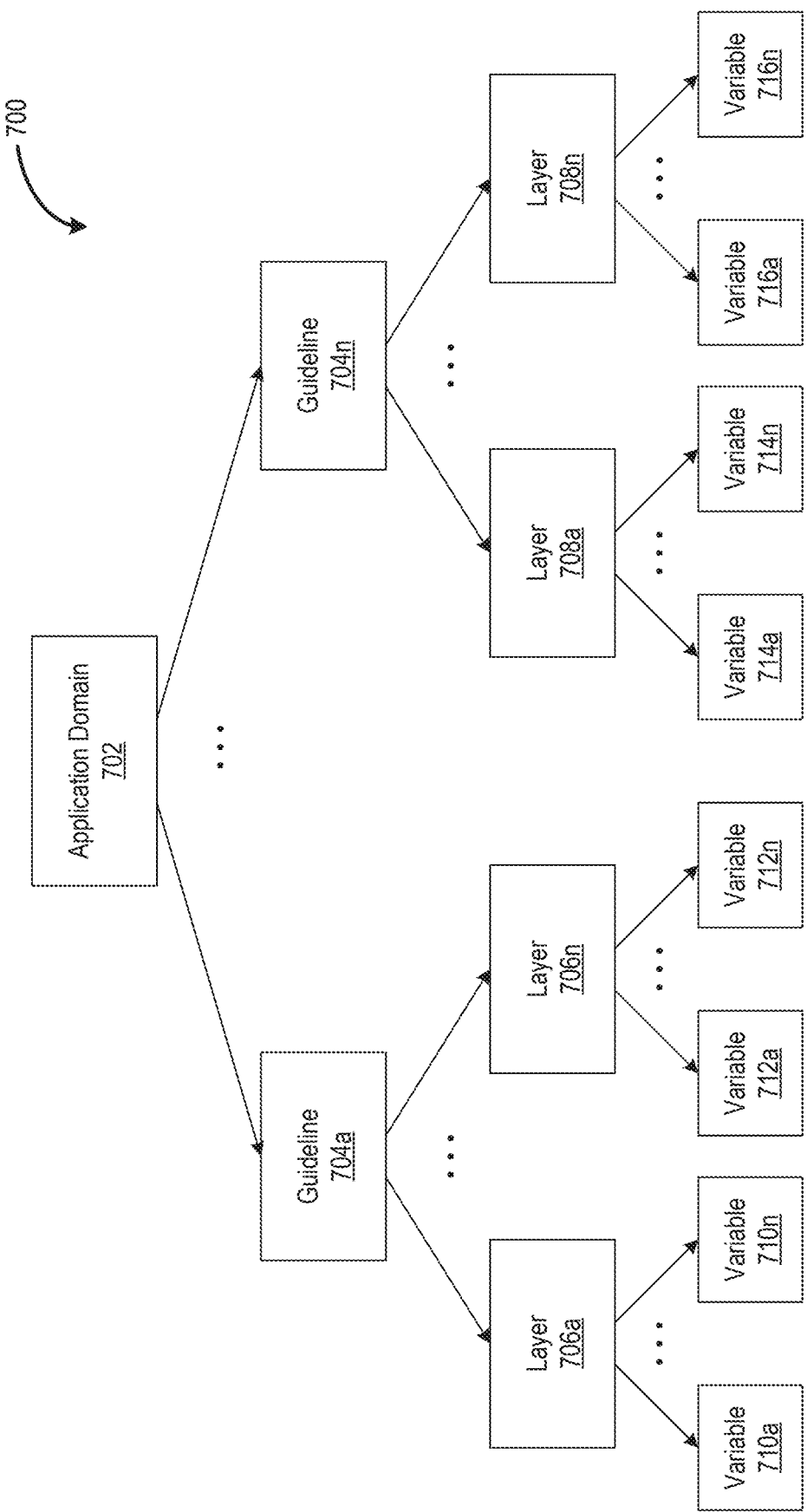
FIG. 7 is an illustrative diagram illustrating an example environment of using an application domain of an LLM to generate layers for a layered prompt.

FIG. 7 is an illustrative diagram illustrating an example environment 700 of using an application domain of an LLM to generate layers for a layered prompt. Environment 700 includes application domain 702, guidelines 704a-n, layers 706a-n, 708a-n, and variables 710a-n, 712a-n, 714a-n, 716a-n for each layer 706a-n, 708a-n. Implementations of example environment 700 can include different and/or additional components or can be connected in different ways.

Application domain 702 is the context in which an LLM is deployed. Context is the same as or similar to the specific context associated with the AI model discussed with reference to FIG. 2. For example, the application domain can encompass various fields such as healthcare, finance, legal, or any other context in which the LLM (e.g., LLM 604 in FIG. 6) is deployed. By deriving the layered prompts in a specific application domain, the system ensures that the prompts are relevant and tailored to the nuances and requirements of the particular field (e.g., application domain 702). Using the application domain 702, relevant guidelines 704a-n are identified, which can include standards such as industry standards, best practices, and/or regulatory requirements. Guidelines 704a-n ensure that the prompt tests the LLM's satisfaction with the specific rules and constraints of guidelines 704a-n. Methods of determining relevant guidelines 704a-n are discussed in greater detail with reference to FIG. 9.

Layers 706a-n, 708a-n derived from each guideline 704a-n represent stages of reasoning, which can be sequential, within each prompt. Layers 706a-n, 708a-n are the same as or similar to layers 106a-n in FIG. 1. Each layer 706a-n, 708a-n focuses on a particular aspect of the guideline 704a-n. The hierarchical structure enables a transparent examination of how the LLM processes information from its inputs and arrives at conclusions (e.g., outputs, responses 606a-n in FIG. 6). Each guideline 704a-n can be broken down into distinct components that cover various aspects of the guideline 704a-n. For example, in a financial context, one layer can focus on data quality, another layer can focus on financial regulatory compliance, a third layer can focus on identifying bias, a fourth layer can be focused on uncertainty, and so on. In some implementations, layers 706a-n, 708a-n within the LLM can be versioned and stored along with metadata, as discussed further with reference to FIG. 1.

Variables 710a-n, 712a-n, 714a-n, 716a-n are associated with each layer 706a-n, 708a-n, representing specific inputs or parameters that influence the prompt construction. Variables 710a-n, 712a-n, 714a-n, 716a-n are the same as or similar to variables with reference to FIG. 2. For example, in FIG. 7, variables 710a-n are associated with layer 706a. Variables 710a-n, 712a-n, 714a-n, 716a-n can include data points, contextual information, user inputs, or other relevant factors that impact the reasoning process at each layer 706a-n, 708a-n. By incorporating variables 710a-n, 712a-n, 714a-n, 716a-n, the system ensures that the prompts are not only contextually relevant but also adaptable to varying scenarios and edge cases. Additional examples of variables are discussed with reference to variables 1006a-n, 1008a-n, and 1010a-n in FIG. 10.

Figure 8:
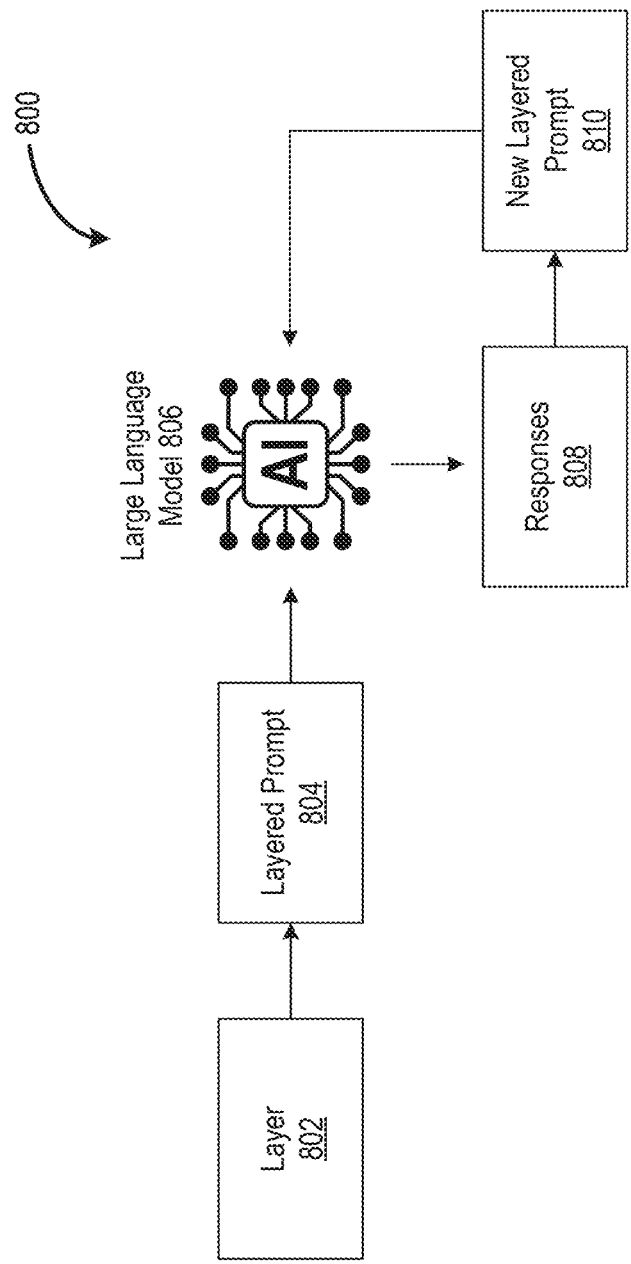
FIG. 8 is an illustrative diagram illustrating an example environment for dynamically generating layered prompts to operate as input in an LLM.

FIG. 8 is an illustrative diagram illustrating an example environment 800 for dynamically generating layered prompts to operate as input in an LLM. Environment 800 includes layer 802, layered prompt 804, LLM 806, responses 808, and new layered prompt 810. Layer 802 is the same as or similar to layers 706a-n, 708a-n illustrated and described in more detail with reference to FIG. 7. Layered prompt 804 is the same as or similar to layered prompts 602a-n illustrated and described in more detail with reference to FIG. 6. LLM 806 is the same as or similar to LLM 604 illustrated and described in more detail with reference to FIG. 6. Responses 808 is the same as or similar to responses 606a-n illustrated and described in more detail with reference to FIG. 6. LLM 806 is implemented using components of example computer system 1200 illustrated and described in more detail with reference to FIG. 12. Likewise, implementations of example environment 800 can include different and/or additional components or can be connected in different ways.

Layer 802 is used to generate layered prompt 804. Methods of generating layered prompt 804 from layer 802 are described in further detail with reference to FIG. 9. Layered prompt 804 is input into LLM 806. LLM 806 processes layered prompt 804 and generates corresponding responses 808. Responses 808 reflect the LLM's 806 interpretation and decision-making based on the structured input provided by the layered prompt 804.

Layered prompt 804 can include contextual information alongside latent variables (e.g., variables 710a-n, 712a-n, 714a-n, 716a-n in FIG. 7). Contextual information refers to additional definitions, keywords, data points, situational cues, environmental factors, and/or scenario-specific factors that influence the LLM's 806 decision-making process. The contextual information can include specific details about the user's query (e.g., definitions, keywords), the current context of the interaction (e.g., scenario-specific factors), historical data (e.g., data points) relevant to the task, or external conditions (e.g., environmental factors) impacting the scenario. By dynamically adjusting the layered prompts 804 to simulate different application domains or user interactions, the system assesses how the LLM's 806 predictions respond to varying scenarios and nuanced inputs. In some implementations, layered prompt 804 includes clauses within the layered prompt 804 that allow for the addition or modification of the contextual information. Rather than solely relying on predefined variables, the system, by using layered prompt 804, iterates towards identifying the nuanced factors that significantly influence the model's outputs.

In some implementations, by incorporating contextual information into layered prompts 804, the system evaluates how the LLM 806 responds to particular elements of the decision-making process beyond the input data alone. For instance, the layered prompts 804 can alter the contextual information to test the LLM's 806 robustness against biases. Using scenarios involving a gender attribute as an example, if providing gender-neutral results is a requirement, the system can introduce contextual information within the layered prompt 804 that subtly introduces bias (e.g., input data/contextual information that infers women are less qualified in a certain task). If the LLM's 806 corresponding output changes based on the biased input (e.g., providing an output that preserves the bias from the input), the output can show that the LLM 806 not responding to input data/contextual information properly, since providing gender-neutral results is a requirement for the LLM 806. Dynamically modifying the layered prompts 804 allows evaluators to assess whether the LLM 806 adheres strictly to the training data or if the LLM 806 is susceptible to external influences that contradict ethical standards or regulatory requirements.

Responses 808 are evaluated to gain insights into the LLM's decision-making process. The system evaluates the responses 808 in response to layered prompt 804 to determine a level of satisfaction of the pre-trained LLM 806 with the particular layer 802 of the guidelines. The evaluation allows the system to identify areas where additional information or further refinement of the prompts may be necessary. Based on the evaluation, a new layered prompt 810 is dynamically generated. In some implementations, new layered prompt 810 builds upon the initial responses 808 of LLM 806 based on layered prompt 804 and can incorporate additional layers or modifications to existing layers or address any gaps or areas requiring further testing. In some implementations, new layered prompt 810 tests a layer of the guidelines that is different from layer 802. Methods of generating new layered prompt 810 from layered prompt 804 are described in further detail with reference to FIG. 9.

The dynamic generation of new layered prompt 810 ensures that the prompts remain contextually relevant and adapt to the evolving understanding of the LLM's behavior. The iterative process allows for continuous refinement and enhancement of the prompts, leading to more precise and interpretable outputs from the LLM 806. By tailoring each subsequent prompt based on previous responses, the system can more effectively assess and evaluate the LLM's 806 reasoning and decision-making, ensuring that the prompts are aligned with the specific requirements and nuances of the given use case. In some implementations, manual input can be used to refine the prompts and construct new layered prompt 810. For instance, if LLM 806 consistently performs poorly in a particular layer, this can be identified through focused prompts that continue to focus on the particular layer to pinpoint the areas of weakness in the LLM 806.

Figure 9:
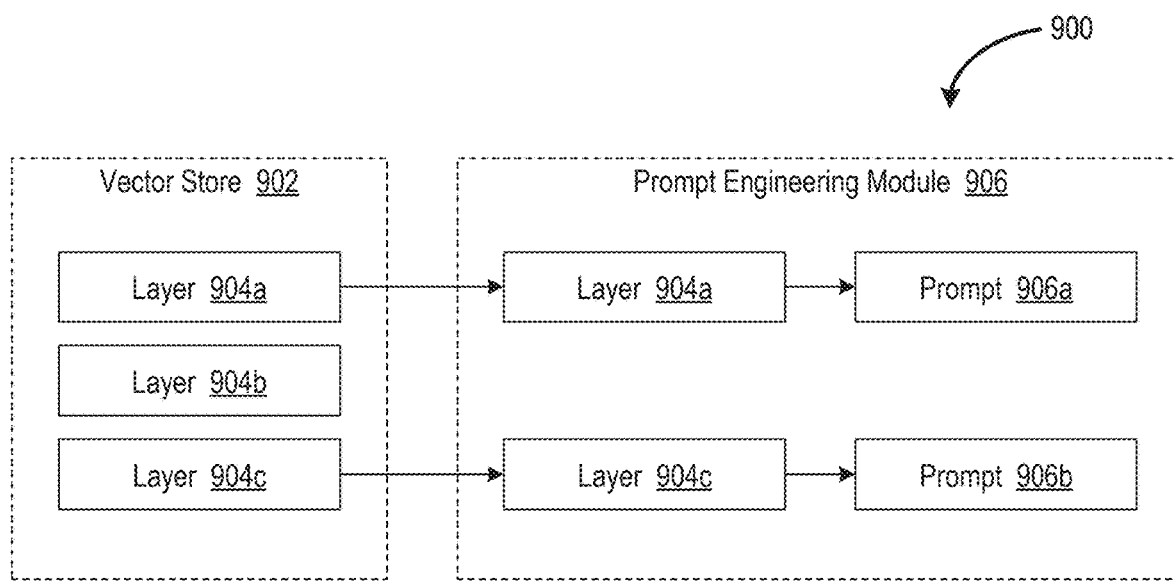
FIG. 9 is an illustrative diagram illustrating an example environment for constructing a layered prompt with layers from a vector store.

FIG. 9 is an illustrative diagram illustrating an example environment 900 for constructing a layered prompt with layers from a vector store. Environment 900 includes vector store 902, layers 904a-c, prompt engineering module 906, and prompts 906a, 906b. Layer 904a-c is the same as or similar to layers 706a-n, 708a-n and layer 802 illustrated and described in more detail with reference to FIG. 7 and FIG. 8, respectively. Prompts 906a, 906b are the same as or similar to layered prompts 602a-n and layered prompt 804 illustrated and described in more detail with reference to FIG. 6 and FIG. 8, respectively. Prompt engineering module 906 is implemented using components of example computer system 1200 illustrated and described in more detail with reference to FIG. 12. Likewise, implementations of example environment 900 can include different and/or additional components or can be connected in different ways.

Vector store 902 is a repository for pre-processed vectors that represent different layers of prompts. These vectors can include domain-specific knowledge, guidelines, and contextual information within each layer. Vector store 902 enables efficient retrieval and assembly of relevant layers based on the specific requirements of the prompt engineering task. Vector store 902 is the same as or similar to vector store 502 illustrated and described in more detail with reference to FIG. 5. Layers 904a-c, stored within vector store 902, can be dynamically selected and retrieved from the vector store 902. For example, in FIG. 9, layer 904a and layer 904c are selected from vector store 902 to generate prompt 906a and prompt 906b respectively.

Prompt engineering module 906 is responsible for assembling the retrieved layers into coherent layered prompts 906a, 906b. Prompt engineering module 906 leverages the vectors of layers 904a, 904c from vector store 902 to construct prompts 906a, 906b that are tailored to the specific use case and objectives of the LLM. Prompt engineering module 906 ensures that each prompt is logically structured and contextually appropriate.

In some implementations, prompt engineering module 906 combines the retrieved vectors (or portions of the retrieved vectors) into structured prompts. Prompt engineering module 906 selects vectors that are relevant to the specific use case and combines them in a way that follows a logical flow (e.g., based on previous responses to previously supplied prompts). For example, if the task is to create a prompt for a cybersecurity application focused on data encryption, the prompt engineering module 906 can retrieve vectors related to encryption standards, best practices, and regulatory requirements. These vectors are then assembled into a prompt that guides the pre-trained LLM through a series of structured questions or scenarios using prompt engineering.

Prompt engineering is a process of structuring text that is able to be interpreted by a generative AI model. For example, in some embodiments, a prompt (e.g., command set) includes the following elements: instruction, context, input data, and an output specification. Although a prompt is a natural-language entity, a number of prompt engineering strategies help structure the prompt in a way that improves the quality of output. For example, in the prompt "Please generate an image of a bear on a bicycle for a children's book illustration," "generate," is the instruction, "for a children's book illustration" is the context, "bears on a bicycle" is the input data, and "an image" is the output specification. The techniques include being precise, specifying context, specifying output parameters, specifying target knowledge domain, and so forth. Automatic prompt engineering techniques have the ability to, for example, include using the pre-trained LLM to generate a plurality of candidate prompts, automatically score the candidates, and select the top candidates.

In some embodiments, prompt engineering includes the automation of a target process—for instance, a prompt causes an AI model to generate computer code, call functions in an API, and so forth. Additionally, in some embodiments, prompt engineering includes automation of the prompt engineering process itself—for example, an automatically generated sequence of cascading prompts, in some embodiments, include sequences of prompts that use tokens from pre-trained LLM outputs as further instructions, context, inputs, or output specifications for downstream pre-trained LLMs. In some embodiments, prompt engineering includes training techniques for LLMs that generate prompts (e.g., chain-of-thought prompting) and improve cost control (e.g., dynamically setting stop sequences to manage the number of automatically generated candidate prompts, dynamically tuning parameters of prompt generation models or downstream models).

To ensure the prompts are logically structured and contextually appropriate, prompt engineering module 906 can apply rules or templates that dictate the organization and format of the prompts. For instance, a template can specify that a prompt should begin with a general question about encryption principles, followed by specific scenarios that test the pre-trained LLM's understanding of management and compliance with regulatory standards. In some implementations, prompt engineering module 906 can use machine learning techniques to enhance the prompt construction process. For example, prompt engineering module 906 can employ clustering algorithms to group similar vectors together, ensuring that related concepts are presented in a coherent manner.

Prompts 906a and 906b represent the outputs of the prompt engineering process. Prompts 906a and 906b are constructed from particular layers (i.e., layers 904a, 904c)

from vector store 902, resulting in inputs that guide the LLM through a multi-phase reasoning process. The layered structure of the prompts allows for a more granular examination of the LLM's decision-making, enabling better interpretability.

Figure 10:
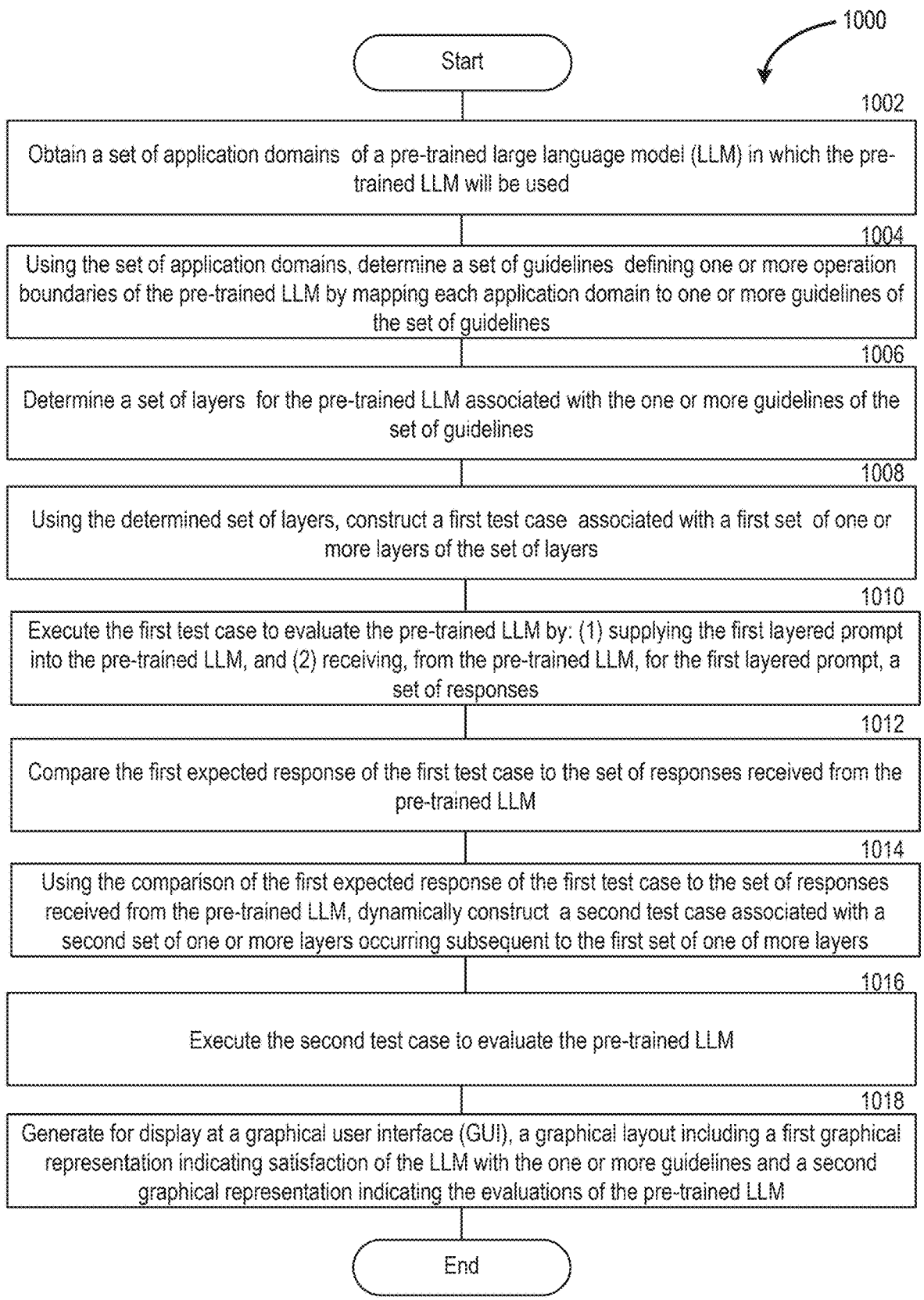
FIG. 10 is a flow diagram illustrating a process of constructing a layered prompt, in accordance with some implementations of the present technology.

FIG. 10 is a flow diagram illustrating a process 1000 of constructing a layered prompt, in accordance with some implementations of the present technology. In some implementations, the process 1000 is performed by components of example computer system 1200 illustrated and described in more detail with reference to FIG. 12. Particular entities, for example, an LLM, are illustrated and described in more detail with reference to LLM 604 and LLM 806 in FIG. 6 and FIG. 8, respectively. Likewise, implementations can include different and/or additional acts or can perform the acts in different orders.

In act 1002, the system obtains a set of application domains of a pre-trained large language model (LLM) in which the pre-trained LLM will be used. The pre-trained LLM generates, in response to a received input, a response. In some implementations, the application domains can be received as an input. For example, the input can be provided by users, administrators, or automated systems responsible for configuring and deploying the pre-trained LLM. Users can specify the intended application domains based on their knowledge of the model's capabilities and the requirements of their organization or use case. In some implementations, the system can determine the application domain of the pre-trained LLM by parsing through the metadata. Metadata associated with the pre-trained LLM can include information about the pre-trained LLM's training data, objectives, intended use cases, and other relevant details. By analyzing this metadata, the system can infer the potential application domains where the pre-trained LLM is likely to be effective and appropriate. For example, if the training data of the pre-trained LLM specifies multiple fields related to cybersecurity (e.g., access timestamp, access location, userID, authentication success), the system can infer, using an ML model trained on labeled data indicating the application domains of sample data, that the pre-trained LLM has at least one application domain focused on cybersecurity.

In some implementations, the system can maintain a catalog of application domains. The system can gather and organize information from various sources, such as receiving direct input from users or extracting application domains from external sources. The catalog of application domains serves as a repository that helps the system in understanding the various contexts (e.g., application domains) in which pre-trained LLMs can be deployed. For example, the system identifies relevant sources of information (e.g., industry-specific guidelines, regulatory requirements). Structured data formats can be used to store tabular information, while unstructured formats like text files or documents can capture more complex information. Additionally, vectorized representations can be used to encode semantic information, facilitating advanced retrieval techniques such as retrieval-augmented generation (RAG).

To ensure the catalog remains accurate and up-to-date, the system can include versioning and timestamping of each application domain. Versioning allows for tracking changes over time, providing a historical record of how application domains have evolved. Timestamps indicate when the information was last updated, ensuring users can assess the currency of the data. For instance, regulatory requirements might change frequently, and having versioned records ensures that pre-trained LLMs can be tested against the most current standards. Metadata can be created to add context and facilitate search and retrieval. Examples of metadata include the regulation name, descriptive names, and other relevant identifiers. In some implementations, the system can identify application domains of the pre-trained LLM using a metadata lookup against guideline data stores or remote sources. By querying metadata repositories, the system can automatically infer the application domains relevant to the model, thus reducing the need for manual input. For example, if a metadata repository includes descriptions of different pre-trained LLMs, the pre-trained LLM's corresponding training data, performance metrics, and/or associated guidelines, when a new pre-trained LLM is introduced, the system can perform a metadata lookup to find matches or similarities with existing models in the repository. This process involves comparing the model's metadata—such as its objectives, training data sources, and functional specifications—with the stored metadata of other models. If the system identifies a close match, it can infer that the new model belongs to the same or a similar application domain. For example, if a pre-trained LLM's metadata indicates that it was trained on financial transaction data and designed to detect fraud, the system can automatically classify it under the domain of financial security or fraud detection.

In act 1004, using the set of application domains, the system determines a set of guidelines defining one or more operation boundaries of the pre-trained LLM by mapping each application domain of the set of application domains to one or more guidelines of the set of guidelines.

The system can, from the obtained set of application domains, determine relevant guidelines that are applicable to the pre-trained LLM's use case (e.g., generating a certain set of guidelines for any pre-trained LLM used in the finance industry, and generating another set of guidelines for any pre-trained LLM used in the healthcare industry. Having consistent guidelines for each industry allows the pre-trained LLMs to be benchmarked more accurately against its peers, as the pre-trained LLMs are evaluated against the same guidelines. Additionally or alternatively, the system can create a new set of relevant guidelines for each pre-trained LLM. The system can evaluate metadata tags, keywords, or categories associated with the guidelines stored in the system's database. Using the specific context and requirements of the AI application, the system filters and retrieves the relevant guidelines from the database.

Various filters can be used to select relevant guidelines. In some implementations, the system uses natural language processing (NLP) to parse through the text of the guidelines and identify key terms, phrases, and clauses that denote regulatory obligations relevant to the AI application's domain. The specific terms related to the AI application's domain can be predefined and include, for example, "patient privacy" for healthcare sector applications. Using the specific terms related to the AI application's domain as a filter, the system can filter out the non-relevant guidelines.

To identify the relevant guidelines from guidelines stored in vector stores, the system can determine the specific terms to use as filters by calculating the similarity between vectors representing application-domain-specific terms (e.g., "healthcare") and vectors representing other terms related to the domain (e.g., "patient privacy"), application-domain-specific terms can be identified based on the proximity of the other terms to known terms of interest. A similarity threshold can be applied to filter out terms that are not sufficiently similar to known application-domain-specific terms.

In some implementations, the system can tag relevant guidelines with attributes that help contextualize the relevant guidelines. The tags serve as markers that categorize and organize the guidelines based on predefined criteria, such as the application domain itself, and/or narrower context such as the regulatory topics (e.g., data privacy, fairness, transparency) or jurisdictional relevance (e.g., regional regulations, industry standards). The tags provide a structured representation of the guidelines and allow for easier retrieval, manipulation, and analysis of regulatory content. The tags and associated metadata can be stored in a structured format, such as a database, where each guideline is linked to the guideline's corresponding tags and application domains. Additionally, the guidelines can be represented in a vector space model, where each guideline is mapped to a high-dimensional vector representing the guideline's semantic features and relationships with other guidelines.

In some implementations, the system determines the set of guidelines, via an ML model, using a location of the pre-trained LLM, a use case of the pre-trained LLM, and/or data sources used in the pre-trained LLM. When a new LLM is introduced, the ML model can analyze metadata associated with the LLM, such as the LLM's deployment location, intended application, and data sources. Based on this analysis, the ML model generates predictions about the relevant guidelines that should be considered for evaluating the LLM's performance and compliance. In some implementations, rule-based systems are used to determine the relevant guidelines. Predefined rules and decision criteria can be applied to each LLM to infer the relevant guidelines. For example, certain application domains are assigned or mapped to a set of predefined guidelines.

With the set of application domains, the system can identify specific fields (e.g., features or variables of the data) used in each act of the LLM's operations. For example, in a threat detection domain, the necessary fields can include network traffic data, user activity logs, and known threat signatures. In some implementations, the guidelines are used to determine a breakdown of positive values for certain fields (e.g., enumerations). Enumerations can include predefined lists of acceptable values or ranges that a field can take. For instance, in an access control LLM, enumerations can include the different roles or permission levels within an organization.

For example, in an LLM designed for financial fraud detection, the appropriate application domain can be determined by analyzing guidelines related to financial transactions, regulatory compliance, and fraud patterns. External sources, such as updates from financial regulatory bodies, can be used to determine the relevant guidelines. The system identifies fields used in the application domain, such as transaction amount, frequency, account history, and geolocation. Using the guidelines, the system defines enumerations for transaction types, acceptable geographical regions, and frequency thresholds.

In act 1006, the system determines a set of layers for the pre-trained LLM associated with the one or more guidelines of the set of guidelines. Each layer within the set of layers includes a set of variables associated with the one or more guidelines of each corresponding layer. Each variable in the set of variables represents an attribute identified within the one or more guidelines of each corresponding layer. The set of guidelines can include governmental regulations of a specific jurisdiction, organization-specific regulations, and/or generative AI applications.

In some implementations, the system receives an indicator of a type of application associated with the pre-trained LLM. The system identifies a relevant set of layers associated with the type of the application defining one or more operation boundaries of the pre-trained LLM. The system can obtain the relevant set of layers, via an Application Programming Interface (API). The type of application can be, for example, the field in which the pre-trained LLM is to be deployed (e.g., finance, healthcare). The system can test the same pre-trained LLM using different application domains for different results based on the benchmarks of the particular field. For example, an AI model used in both the financial and healthcare fields can be graded twice under different application domains, and receive potentially different grades.

In some implementations, the set of layers can be dynamically determined by an ML model. The ML model can identify the set of application domains associated with the pre-trained LLM. Methods of dynamically determining the set of layers are described in further detail with reference to act 1002 in FIG. 10.

In some implementations, subsequently constructed layered prompts are more complex than preceding layered prompts. For example, the variables of the second set of the one or more layers of the set of layers can be more complex than the variables of the first set of the one or more layers of the set of layers. For example, variables of the first set of layers can include straightforward data points such as IP addresses, timestamps, or simple yes/no questions about the presence of security protocols. Variables of the second set of layers can include more complex patterns of network traffic.

In some implementations, subsequently constructed layered prompts are more complex than preceding layered prompts. The complexity increase can include increases in computations or mathematical representations. For example, initial layers can use simple statistical summaries or basic arithmetic operations, while subsequent layers could incorporate complex algorithms or probabilistic models. For example, in financial applications, preceding layered prompts can include basic revenue figures or simple growth rates, while subsequent layered prompts can require the LLM to interpret stochastic models predicting market trends. In some implementations, the functions within the layered prompts (e.g., via the variables) can become more complex between layers. In another example, preceding layered prompts can include simple logical functions or direct mappings, whereas subsequent layered prompts can involve nested functions, recursive algorithms, or optimization problems. For example, in a routing model, initial layers might handle straightforward route calculations, while subsequent layers can manage dynamic routing optimizations considering real-time traffic data, fuel consumption models, and delivery constraints.

In some implementations, subsequently constructed layered prompts have greater computational complexity, which is associated with time (e.g., sequence length, dimensionality) and space (e.g., number of parameters, memory required, number of layers). Sequence length refers to the length of input or output sequences processed by the AI model. Longer sequences require more computation, as each token or word in the sequence must be processed and contextualized within the entire sequence. A longer sequence can increase the complexity of computation due to the longer time required for training and inference. Dimensionality refers to the size of the input and output vectors, representing the data processed by the AI model. Higher dimensionality means each data point is represented with more features, increasing the complexity of the computations the AI model performs. The number of parameters refers to the total count of weights and biases in the model, which directly impacts the model's ability to learn and generalize from data. Greater parameters can mean more complex and potentially more accurate models, but greater parameters also require increased memory and computational resources to manage. Memory required includes the amount of RAM or other memory resources needed to store the model parameters and intermediate computation results during training and inference.

The complexity of layered prompts in an AI model affects both time and space complexity. Added complexity can add additional computation and storage requirements, as the data must pass through multiple transformations and computations from input to output. More layers being covered in a layered prompt generally allow the model to capture more complex patterns and dependencies in the data, but more layers also increase the overall computational load and memory usage.

The set of layers can be an LLM-specific set of layers. In some implementations, the system receives an input indicative of an overall set of layers and the set of variables for each layer of the overall set of layers. Using an ML model, the system can identify the application domains within the overall set of layers with the obtained application domains related to the pre-trained LLM. The system can extract the LLM-specific set of layers from the overall set of layers using the comparison.

In some implementations, one or more of the layers within the set of layers can relate to attempts to access data. The corresponding set of variables can relate to an author associated with the attempt, a timestamp associated with the attempt, a location associated with the attempt, a presence of an authorization related to the attempt, previous unsuccessful attempts to access the data, and/or frequency of the attempts. Further examples of layers related to attempts to access data are discussed with reference to FIG. 9.

In some implementations, one or more of the layers within the set of layers can relate to quality of input data. The corresponding set of variables can relate to an author associated with the input data, a timestamp associated with the input data, a location associated with the input data, a presence of structured metadata, an absence of structured metadata, and/or outliers in the input data. Further examples of layers related to data quality are discussed with reference to FIG. 9.

In act 1008, using the determined set of layers, the system constructs a first test case associated with a first set of one or more layers of the set of layers. The first test case maps to a first scenario derived from the first set of one or more layers of the set of layers. The first test case includes: (1) a first layered prompt and (2) a first expected response. The first test case tests the one or more operation boundaries of the corresponding guidelines of the first set of the one or more layers of the set of layers. Methods of constructing the first layered prompt are discussed with reference to prompts 906a, 906b in FIG. 9.

In some implementations, to construct the layered prompt for each layer, the system can transform the layers of the LLM using a rule-based engine. For example, the system can project/map the layers and/or variables of the LLM onto parameters that can operate within an LLM. Each layered prompt is configured to direct an LLM to perform specific computations that contribute to the overall decision-making process. The rule-based engine maps each layer to a particular set of metrics. For example, the rule-based engine can map a layer's task of identifying part-of-speech tags in text to specific metrics that are responsible for recognizing syntactic patterns. Similarly, a layer focused on sentiment analysis can be mapped to parameters that detect positive or negative word usage based on historical data.

The expected response is what the system anticipates the LLM should output when processing the first layered prompt. This could be a specific action or decision, such as flagging a transaction for further review, generating an alert for a potential rule violation, or providing a rationale for why a transaction is considered compliant. The expected response serves as a benchmark to evaluate the LLM's performance and adherence to the guidelines.

In act 1010, the system executes the first test case to evaluate the pre-trained LLM. The system supplies the first layered prompt into the pre-trained LLM. Responsive to inputting the first layered prompt, the system receives, from the pre-trained LLM, for the first layered prompt, a set of responses.

Inputting the prompt can use an API or a command interface that communicates with the pre-trained LLM. After supplying the first layered prompt, the pre-trained LLM interprets the prompt according to the pre-trained LLM's training. The set of responses results from the LLM applying its internal algorithms and learned knowledge to produce outputs that align with the rules and constraints defined in the prompt. The responses can vary depending on the complexity of the prompt and the specific layers involved. For example, in a compliance-checking scenario, the responses might include flagged transactions, risk scores, or explanations for why certain transactions are deemed suspicious.

In act 1012, the system compares the first expected response of the first test case to the set of responses received from the pre-trained LLM. In some implementations, the system automatically evaluates the received responses against the expected responses defined in the test case. This involves comparing the LLM's outputs to the predefined criteria to determine whether the LLM's reasoning and decision-making are correct and compliant. For example, if the prompt included a known fraudulent transaction, the expected response can be for the LLM to flag it appropriately. The system checks if the LLM's response matches this expectation.

In act 1014, using the comparison of the first expected response of the first test case to the set of responses received from the pre-trained LLM, the system dynamically constructs a second test case associated with a second set of one or more layers of the set of layers occurring subsequent to the first set of one of more layers of the set of layers. The second test case maps to a second scenario derived from the second set of one or more layers of the set of layers. The second test case includes: (1) a second layered prompt and (2) a second expected response. The second test case tests the one or more operation boundaries of the corresponding guidelines of the second set of the one or more layers of the set of layers. In some implementations, the second set of the one or more operation boundaries of the set of guidelines is different from the first set of the one or more operation boundaries of the set of guidelines. In some implementations, the second set of the one or more operation boundaries of the set of guidelines is the same as the first set of the one or more operation boundaries of the set of guidelines.

For example, to construct the second test case, the system can first assess, based on the comparison of the first expected response of the first test case to the set of responses received from the pre-trained LLM, both the current and target requirements or guidelines (e.g., jurisdictional, organizational, AI-type specific). In a cybersecurity context, the system can identify existing cybersecurity protocols, frameworks, and technologies in use, alongside defining the desired cybersecurity posture aligned with organizational goals, regulatory standards, and industry best practices. The system can identify any gaps or deficiencies between the current and target requirements or guidelines. For example, in a cybersecurity context, gaps can encompass areas such as network security, data protection measures, access controls, and/or incident response protocols. Once the system understands the gaps, the system can prioritize the layers used within subsequent test cases (e.g., by adjusting the weights of particular layers, by omitting or including certain layers). For example, layers can be ranked based on their relevance to the organization's mission, legal and regulatory requirements, and/or risk management expectations. Moreover, the system can continuously monitor and track progress toward addressing the identified gaps to adjust the layers (e.g., by adjusting the weights of particular layers, by omitting or including certain layers) based on the sets of responses received from the LLM.

In some implementations, the gap can be identified using a machine learning model trained on labeled training data to learn patterns and relationships between features and guideline sources. For example, the labeled training data can be sets of guidelines based on the type of guideline they belong to (e.g., current guideline, target guideline). Using the trained model, the system can use the trained model to identify differences between the sets of guidelines by analyzing the features that contribute most to the classification decision (e.g., current guideline, target guideline) of each set of guidelines and identifying areas of divergence or overlap between the guidelines.

In act 1016, the system executes the second test case to evaluate the pre-trained LLM. Executing the second test case is done in the same or similar manner as executing the first test case in act 1010 with reference to FIG. 10.

In act 1018, the system generates for display at a graphical user interface (GUI), a graphical layout including a first graphical representation indicating satisfaction of the LLM with the one or more guidelines of the set of guidelines of the corresponding application domain and a second graphical representation indicating the evaluations of the pre-trained LLM by the first test case and the second test case.

The first graphical representation can be a summary of how well the LLM's responses align with the predefined rules and constraints of the application domain. For example, the first graphical representation can be visualized using a compliance score, where a higher score indicates greater adherence to the guidelines. Alternatively, a color-coded system (e.g., green for compliant, yellow for partial compliance, red for non-compliance) can be used to provide a visual indicator of the LLM's performance against each guideline. The second graphical representation can include the LLM's performance metrics, such as accuracy, precision, recall, and other relevant indicators. A bar chart or line graph could be used to show changes in these metrics between the test cases, illustrating how the LLM's performance has evolved. Additionally, the GUI can include specific areas where the LLM has improved or needs further adjustment.

In some implementations, using the comparison of the first expected response of the first test case to the set of responses received from the pre-trained LLM, the system generates an indicator of the pre-trained LLM indicating compliance of the pre-trained LLM with the corresponding guidelines of the first set of the one or more layers of the set of layers. The indicator can indicate the first set of the one or more layers, the corresponding sets of variables of the first set of the one or more layers, and/or predetermined weights used for each layer of the first set of the one or more layers.

In some implementations, the graphical representation indicating satisfaction of the LLM with the one or more guidelines of the set of guidelines of the corresponding application domain includes a binary indicator indicating the satisfaction, a category indicating the satisfaction, and/or a probability of the satisfaction. The binary indicator can indicate whether the pre-trained LLM meets the specified criteria (e.g., compliance with cybersecurity measures) or fails to do so. A categorical grade reflects the overall performance of the pre-trained LLM in meeting the criteria established for that particular category. For example, grades may be categorized as "Excellent," "Good," "Fair," or "Poor," based on the degree of satisfaction demonstrated by the pre-trained LLM. A probability-based grade provides a quantitative measure of confidence in the assigned grade. The probability indicates the likelihood that the pre-trained LLM's performance aligns with the specified benchmarks for the application domain. In some implementations, rather than receiving a specific-type grade, the measurements taken from the assessment results are used as the grades themselves. In some implementations, in response to reaching a non-compliance threshold indicating an absence of adherence to the set of guidelines, the system can prevent assigning additional grades to preserve computing resources.

The system can assign a weight to each layer within the set of layers of the pre-trained LLM. Using the set of responses, the system can generate an overall score indicating satisfaction with the one or more operation boundaries of the corresponding guidelines of the first set of the one or more layers of the set of layers in accordance with the assigned weight of the first layer. The weights can change based on the type of AI application. For example, for a security AI model, cybersecurity-related application domains such as data encryption or vulnerability management may carry higher weights due to their higher importance in ensuring system security. In some implementations, the system generates confidence scores for each assigned grade. The confidence scores represent a reliability of the assigned grade.

In some implementations, the system can identify one or more new layers within the set of responses, and iteratively update the set of layers by adding the one or more new layers to the set of layers. Methods of iteratively updating the set of layers are described in further detail with reference to act 1002 in FIG. 10.

AI System

Figure 11:
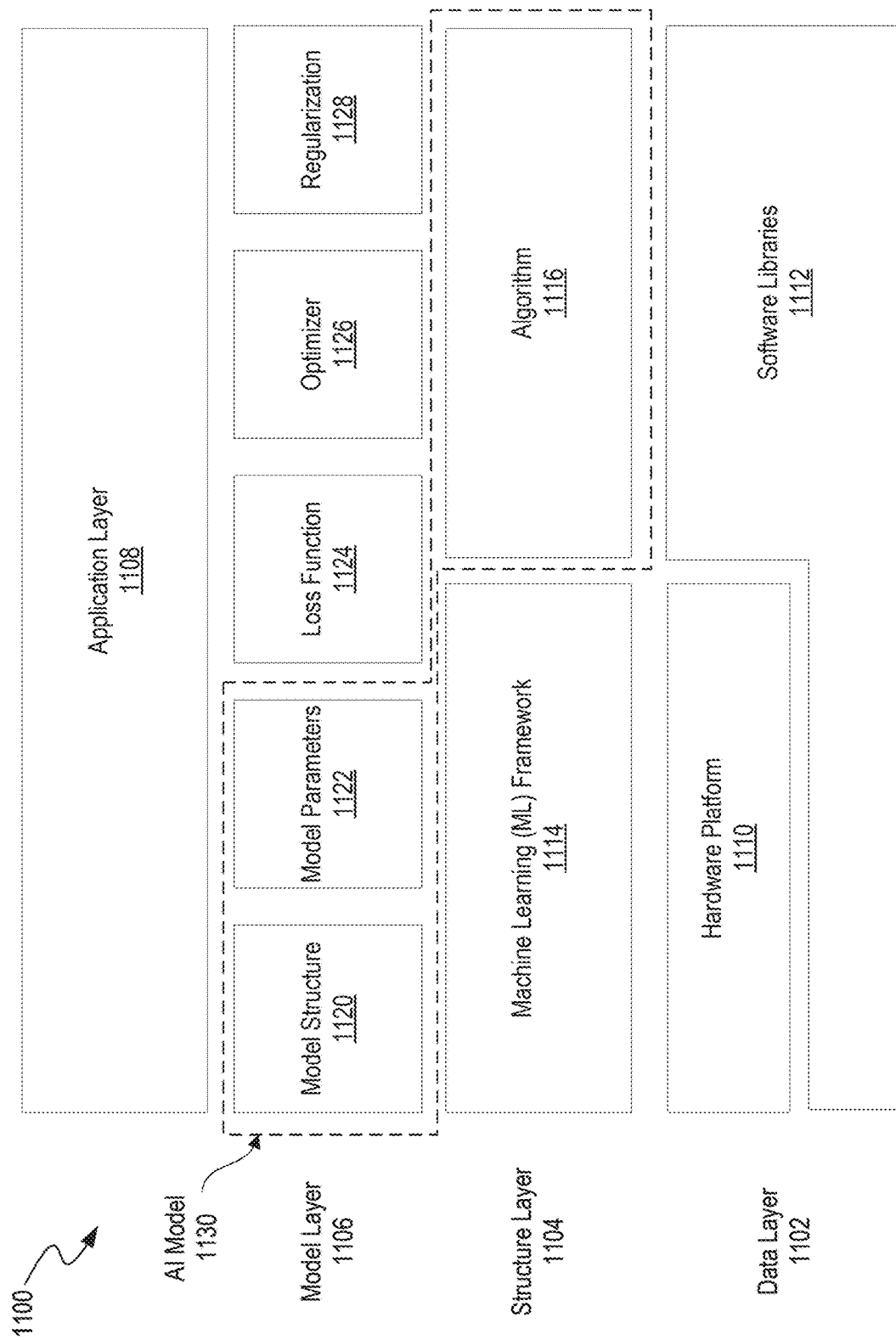
FIG. 11 is a high-level block diagram illustrating an example AI system, in accordance with one or more implementations.

FIG. 11 is a block diagram illustrating an example artificial intelligence (AI) system 1100, in accordance with one or more implementations of this disclosure. The AI system 1100 is implemented using components of the example computer system 1200 illustrated and described in more detail with reference to FIG. 12. For example, the AI system 1100 can be implemented using the processor 1202 and instructions 1208 programmed in the memory 1206 illustrated and described in more detail with reference to FIG. 12. Likewise, implementations of the AI system 1100 can include different and/or additional components or be connected in different ways.

As shown, the AI system 1100 can include a set of layers, which conceptually organize elements within an example network topology for the AI system's architecture to implement a particular AI model 1130. Generally, an AI model 1130 is a computer-executable program implemented by the AI system 1100 that analyzes data to make predictions.

Information can pass through each layer of the AI system 1100 to generate outputs for the AI model 1130. The layers can include a data layer 1102, a structure layer 1104, a model layer 1106, and an application layer 1108. The algorithm 1116 of the structure layer 1104 and the model structure 1120 and model parameters 1122 of the model layer 1106 together form the example AI model 1130. The optimizer 1126, loss function engine 1124, and regularization engine 1128 work to refine and optimize the AI model 1130, and the data layer 1102 provides resources and support for application of the AI model 1130 by the application layer 1108.

The data layer 1102 acts as the foundation of the AI system 1100 by preparing data for the AI model 1130. As shown, the data layer 1102 can include two sub-layers: a hardware platform 1110 and one or more software libraries 1112. The hardware platform 1110 can be designed to perform operations for the AI model 1130 and include computing resources for storage, memory, logic, and networking, such as the resources described in relation to FIG. 12. The hardware platform 1110 can process amounts of data using one or more servers. The servers can perform backend operations such as matrix calculations, parallel calculations, machine learning (ML) training, and the like. Examples of servers used by the hardware platform 1110 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 1110 can include Infrastructure as a Service (IaaS) resources, which are computing resources, (e.g., servers, memory, etc.) offered by a cloud services provider. The hardware platform 1110 can also include computer memory for storing data about the AI model 1130, application of the AI model 1130, and training data for the AI model 1130. The computer memory can be a form of random-access memory (RAM), such as dynamic RAM, static RAM, and non-volatile RAM.

The software libraries 1112 can be thought of as suites of data and programming code, including executables, used to control the computing resources of the hardware platform 1110. The programming code can include low-level primitives (e.g., fundamental language elements) that form the foundation of one or more low-level programming languages, such that servers of the hardware platform 1110 can use the low-level primitives to carry out specific operations. The low-level programming languages do not require much, if any, abstraction from a computing resource's instruction set architecture, allowing them to run quickly with a small memory footprint. Examples of software libraries 1112 that can be included in the AI system 1100 include Intel Math Kernel Library, Nvidia cuDNN, Eigen, and Open BLAS.

The structure layer 1104 can include a machine learning (ML) framework 1114 and an algorithm 1116. The ML framework 1114 can be thought of as an interface, library, or tool that allows users to build and deploy the AI model 1130. The ML framework 1114 can include an open-source library, an application programming interface (API), a gradient-boosting library, an ensemble method, and/or a deep learning toolkit that work with the layers of the AI system facilitate development of the AI model 1130. For example, the ML framework 1114 can distribute processes for application or training of the AI model 1130 across multiple resources in the hardware platform 1110. The ML framework 1114 can also include a set of pre-built components that have the functionality to implement and train the AI model 1130 and allow users to use pre-built functions and classes to construct and train the AI model 1130. Thus, the ML framework 1114 can be used to facilitate data engineering, development, hyperparameter tuning, testing, and training for the AI model 1130.

Examples of ML frameworks 1114 or libraries that can be used in the AI system 1100 include TensorFlow, PyTorch, Scikit-Learn, Keras, and Caffe. Random Forest is a machine learning algorithm that can be used within the ML frameworks 1114. LightGBM is a gradient boosting framework/algorithm (an ML technique) that can be used. Other techniques/algorithms that can be used are XGBoost, CatBoost, etc. Amazon Web Services is a cloud service provider that offers various machine learning services and tools (e.g., Sage Maker) that can be used for platform building, training, and deploying ML models.

In some implementations, the ML framework 1114 performs deep learning (also known as deep structured learning or hierarchical learning) directly on the input data to learn data representations, as opposed to using task-specific algorithms. In deep learning, no explicit feature extraction is performed; the features of feature vector are implicitly extracted by the AI system 1100. For example, the ML framework 1114 can use a cascade of multiple layers of nonlinear processing units for implicit feature extraction and transformation. Each successive layer uses the output from the previous layer as input. The AI model 1130 can thus learn in supervised (e.g., classification) and/or unsupervised (e.g., pattern analysis) modes. The AI model 1130 can learn multiple levels of representations that correspond to different levels of abstraction, wherein the different levels form a hierarchy of concepts. In this manner, AI model 1130 can be configured to differentiate features of interest from background features.

The algorithm 1116 can be an organized set of computer-executable operations used to generate output data from a set of input data and can be described using pseudocode. The algorithm 1116 can include complex code that allows the computing resources to learn from new input data and create new/modified outputs based on what was learned. In some implementations, the algorithm 1116 can build the AI model 1130 through being trained while running computing resources of the hardware platform 1110. The training allows the algorithm 1116 to make predictions or decisions without being explicitly programmed to do so. Once trained, the algorithm 1116 can run at the computing resources as part of the AI model 1130 to make predictions or decisions, improve computing resource performance, or perform tasks. The algorithm 1116 can be trained using supervised learning, unsupervised learning, semi-supervised learning, and/or reinforcement learning.

Using supervised learning, the algorithm 1116 can be trained to learn patterns (e.g., map input data to output data) based on labeled training data. The training data can be labeled by an external user or operator. The user can label the training data based on one or more classes and trains the AI model 1130 by inputting the training data to the algorithm 1116. The algorithm determines how to label the new data based on the labeled training data. The user can facilitate collection, labeling, and/or input via the ML framework 1114. In some instances, the user can convert the training data to a set of feature vectors for input to the algorithm 1116. Once trained, the user can test the algorithm 1116 on new data to determine if the algorithm 1116 is predicting accurate labels for the new data. For example, the user can use cross-validation methods to test the accuracy of the algorithm 1116 and retrain the algorithm 1116 on new training data if the results of the cross-validation are below an accuracy threshold.

Supervised learning can involve classification and/or regression. Classification techniques involve teaching the algorithm 1116 to identify a category of new observations based on training data and are used when input data for the algorithm 1116 is discrete. Said differently, when learning through classification techniques, the algorithm 1116 receives training data labeled with categories (e.g., classes) and determines how features observed in the training data relate to the categories. Once trained, the algorithm 1116 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 1116 is continuous. Regression techniques can be used to train the algorithm 1116 to predict or forecast relationships between variables. To train the algorithm 1116 using regression techniques, a user can select a regression method for estimating the parameters of the model. The user collects and labels training data that is input to the algorithm 1116 such that the algorithm 1116 is trained to understand the relationship between data features and the dependent variable(s). Once trained, the algorithm 1116 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine-learning based pre-processing operations.

Under unsupervised learning, the algorithm 1116 learns patterns from unlabeled training data. In particular, the algorithm 1116 is trained to learn hidden patterns and insights of input data, which can be used for data exploration or for generating new data. Here, the algorithm 1116 does not have a predefined output, unlike the labels output when the algorithm 1116 is trained using supervised learning. Another way unsupervised learning is used to train the algorithm 1116 to find an underlying structure of a set of data is to group the data according to similarities and represent that set of data in a compressed format.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has less or no similarities to another group. Examples of clustering techniques density-based methods, hierarchical based methods, partitioning methods, and grid-based methods. In one example, the algorithm 1116 can be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 1116 can be trained to be an Isolation Forest, local outlier factor (LOF) algorithm, or K-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that can be used by the algorithm 1116 include factor analysis, item response theory, latent profile analysis, and latent class analysis.

In some implementations, the AI system 1100 trains the algorithm 1116 of AI model 1130, based on the training data, to correlate the feature vector to expected outputs in the training data. As part of the training of the AI model 1130, the AI system 1100 forms a training set of features and training labels by identifying a positive training set of features that have been determined to have a desired property in question, and, in some implementations, forms a negative training set of features that lack the property in question. The AI system 1100 applies ML framework 1114 to train the AI model 1130, that when applied to the feature vector, outputs indications of whether the feature vector has an associated desired property or properties, such as a probability that the feature vector has a particular Boolean property, or an estimated value of a scalar property. The AI system 1100 can further apply dimensionality reduction (e.g., via linear discriminant analysis (LDA), PCA, or the like) to reduce the amount of data in the feature vector to a smaller, more representative set of data.

The model layer 1106 implements the AI model 1130 using data from the data layer and the algorithm 1116 and ML framework 1114 from the structure layer 1104, thus enabling decision-making capabilities of the AI system 1100. The model layer 1106 includes a model structure 1120, model parameters 1122, a loss function engine 1124, an optimizer 1126, and a regularization engine 1128.

The model structure 1120 describes the architecture of the AI model 1130 of the AI system 1100. The model structure 1120 defines the complexity of the pattern/relationship that the AI model 1130 expresses. Examples of structures that can be used as the model structure 1120 include decision trees, support vector machines, regression analyses, Bayesian networks, Gaussian processes, genetic algorithms, and artificial neural networks (or, simply, neural networks). The model structure 1120 can include a number of structure layers, a number of nodes (or neurons) at each structure layer, and activation functions of each node. Each node's activation function defines how to node converts data received to data output. The structure layers can include an input layer of nodes that receive input data, an output layer of nodes that produce output data. The model structure 1120 can include one or more hidden layers of nodes between the input and output layers. The model structure 1120 can be an Artificial Neural Network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 1122 represent the relationships learned during training and can be used to make predictions and decisions based on input data. The model parameters 1122 can weight and bias the nodes and connections of the model structure 1120. For example, when the model structure 1120 is a neural network, the model parameters 1122 can weight and bias the nodes in each layer of the neural networks, such that the weights determine the strength of the nodes and the biases determine the thresholds for the activation functions of each node. The model parameters 1122, in conjunction with the activation functions of the nodes, determine how input data is transformed into desired outputs. The model parameters 1122 can be determined and/or altered during training of the algorithm 1116.

The loss function engine 1124 can determine a loss function, which is a metric used to evaluate the AI model's 1130 performance during training. For example, the loss function engine 1124 can measure the difference between a predicted output of the AI model 1130 and the actual output of the AI model 1130 and is used to guide optimization of the AI model 1130 during training to minimize the loss function. The loss function can be presented via the ML framework 1114, such that a user can determine whether to retrain or otherwise alter the algorithm 1116 if the loss function is over a threshold. In some instances, the algorithm 1116 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 1126 adjusts the model parameters 1122 to minimize the loss function during training of the algorithm 1116. In other words, the optimizer 1126 uses the loss function generated by the loss function engine 1124 as a guide to determine what model parameters lead to the most accurate AI model 1130. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 1126 used can be determined based on the type of model structure 1120 and the size of data and the computing resources available in the data layer 1102.

The regularization engine 1128 executes regularization operations. Regularization is a technique that prevents over- and under-fitting of the AI model 1130. Overfitting occurs when the algorithm 1116 is overly complex and too adapted to the training data, which can result in poor performance of the AI model 1130. Underfitting occurs when the algorithm 1116 is unable to recognize even basic patterns from the training data such that it cannot perform well on training data or on validation data. The regularization engine 1128 can apply one or more regularization techniques to fit the algorithm 1116 to the training data properly, which helps constraint the resulting AI model 1130 and improves its ability for generalized application. Examples of regularization techniques include lasso (L1) regularization, ridge (L2) regularization, and elastic (L1 and L2 regularization).

In some implementations, the AI system 1100 can include a feature extraction module implemented using components of the example computer system 1200 illustrated and described in more detail with reference to FIG. 12. In some implementations, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as feature vector. The feature vector contains the relevant information from the input data, such that events or data value thresholds of interest can be identified by the AI model 1130 by using the reduced representation. In some example implementations, the following dimensionality reduction techniques are used by the feature extraction module: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

Computer System

Figure 12:
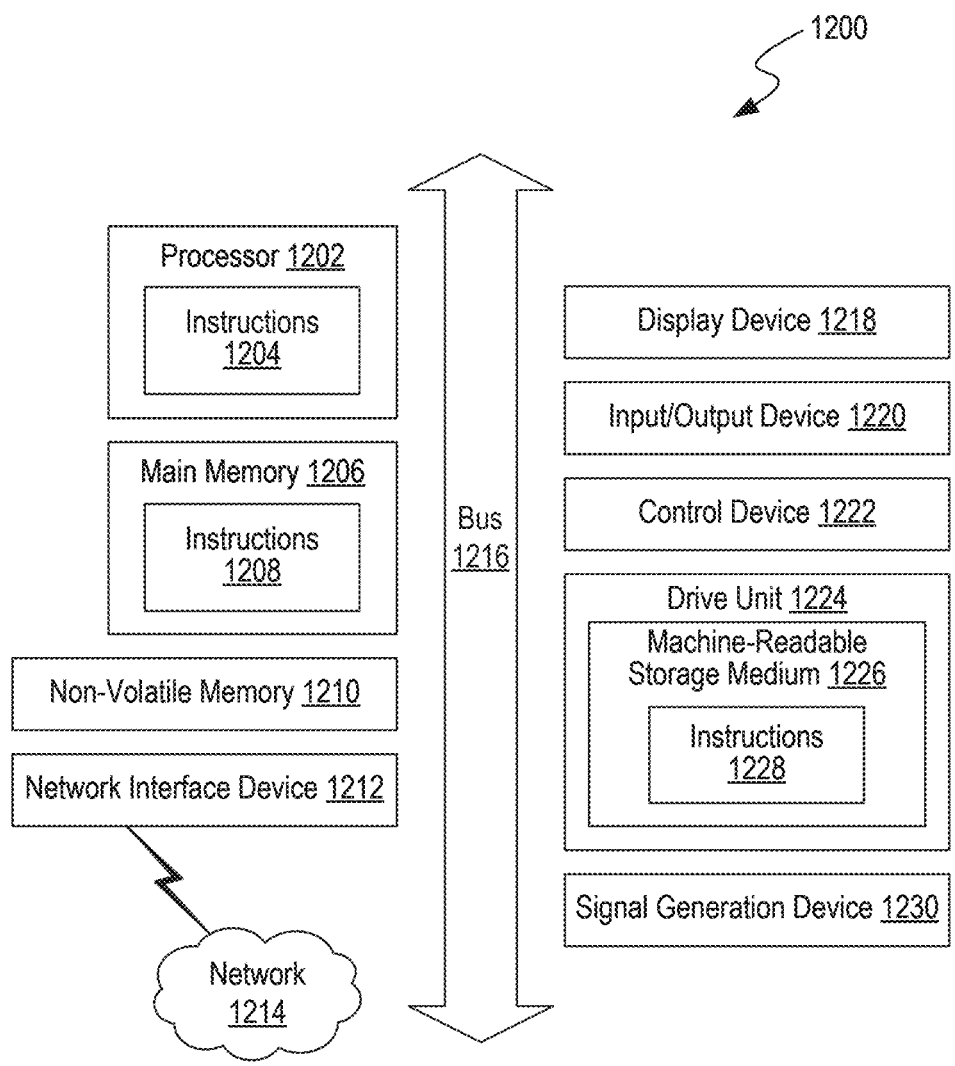
FIG. 12 is a block diagram illustrating an example computer system, in accordance with one or more implementations.

FIG. 12 is a block diagram that illustrates an example of a computer system 1200 in which at least some operations described herein can be implemented. As shown, the computer system 1200 can include: one or more processors 1202, main memory 1206, non-volatile memory 1210, a network interface device 1212, a video display device 1218, an input/output device 1220, a control device 1222 (e.g., keyboard and pointing device), a drive unit 1224 that includes a machine-readable (storage) medium 1226, and a signal generation device 1230 that are communicatively connected to a bus 1216. The bus 1216 represents one or more physical buses and/or point-to-point connections that are connected by appropriate bridges, adapters, or controllers. Various common components (e.g., cache memory) are omitted from FIG. 12 for brevity. Instead, the computer system 1200 is intended to illustrate a hardware device on which components illustrated or described relative to the examples of the figures and any other components described in the specification can be implemented.

The computer system 1200 can take any suitable physical form. For example, the computing system 1200 can share a similar architecture as that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 1200. In some implementations, the computer system 1200 can be an embedded computer system, a system-on-chip (SOC), a single-board computer system (SBC), or a distributed system such as a mesh of computer systems, or it can include one or more cloud components in one or more networks. Where appropriate, one or more computer systems 1200 can perform operations in real time, in near real time, or in batch mode.

The network interface device 1212 enables the computing system 1200 to mediate data in a network 1214 with an entity that is external to the computing system 1200 through any communication protocol supported by the computing system 1200 and the external entity. Examples of the network interface device 1212 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1206, non-volatile memory 1210, machine-readable medium 1226) can be local, remote, or distributed. Although shown as a single medium, the machine-readable medium 1226 can include multiple media (e.g., a centralized/distributed database and/ or associated caches and servers) that store one or more sets of instructions 1228. The machine-readable medium 1226 can include any medium that is capable of storing, encoding, or carrying a set of instructions for execution by the computing system 1200. The machine-readable medium 1226 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite the change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1210, removable flash memory, hard disk drives, optical disks, and transmission-type media such as digital and analog communication links. In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1204, 1208, 1228) set at various times in various memory and storage devices in computing device(s). When read and executed by the processor 1202, the instruction(s) cause the computing system 1200 to perform operations to execute elements involving the various aspects of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples: alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

We claim:

1. A method for constructing layered prompts to evaluate and assess performance of pre-trained large language models, the method comprising:
   obtaining a set of application domains of a pre-trained large language model (LLM) in which the pre-trained LLM will be used,
      wherein the pre-trained LLM is configured to generate, in response to a received input, a response;
   using the set of application domains, determining a set of guidelines defining one or more operation boundaries of the pre-trained LLM by mapping each application domain of the set of application domains to one or more guidelines of the set of guidelines;
   determining a set of layers for the pre-trained LLM associated with the one or more guidelines of the set of guidelines,
      wherein each layer within the set of layers includes a layer-specific model logic and a set of variables associated with the one or more guidelines of each corresponding layer, wherein the layer-specific model logic includes weights, biases, activation functions, and regulatory or contextual parameters, and wherein each variable in the set of variables represents an attribute identified within the one or more guidelines of each corresponding layer;

for a first set of one or more layers of the set of layers, constructing a first test case comprising (1) a first layered prompt and (2) a first expected response, wherein the constructing the first test case comprises transforming the first set of one or more layers of the set of layers using a rule-based engine, wherein the rule-based engine maps the first test case to a first scenario derived from the first set of one or more layers of the set of layers, and performing computations that contributes to an overall decision-making process using each layer-specific model logic in the pre-trained LLM;

wherein the first layered prompt is configured to measure one or more values of a corresponding set of variables of the first set of one or more layers, and wherein the first test case is configured to test the one or more operation boundaries of corresponding guidelines of the first set of the one or more layers of the set of layers;

executing the first test case to evaluate the pre-trained LLM by:

supplying the first layered prompt into the pre-trained LLM, and responsive to inputting the first layered prompt, receiving, from the pre-trained LLM, for the first layered prompt, a set of responses;

aggregating the set of responses received from each layer using weights for each layer;

generating an overall result based on the aggregated responses;

generating an indicator of compliance with the guidelines by comparing the first expected response of the first test case to the set of responses generated as an overall result received from the pre-trained LLM, wherein the indicator of compliance reflects specific layers of the first layered prompt, variables of the first layered prompt, or weights assigned to each layer;

using the indicator of compliance with the guidelines generated based on comparison of the first expected response of the first test case to the set of responses received from the pre-trained LLM, dynamically constructing a second test case testing a second set of one or more layers of the set of layers occurring subsequent to the first set of one of more layers of the set of layers, wherein the constructing the second test case comprises transforming the second set of one or more layers of the set of layers using the rule-based engine, wherein the rule-based engine maps the second test case maps to a second scenario derived from the second set of one or more layers of the set of layers, and performing computations that contributes to an overall decision-making process using each layer-specific model logic in the pre-trained LLM;

wherein the second test case comprises: (1) a second layered prompt and (2) a second expected response, and wherein the second test case is configured to test the one or more operation boundaries of corresponding guidelines of the second set of the one or more layers of the set of layers;

executing the second test case to evaluate the pre-trained LLM;

generating for display at a graphical user interface (GUI), a graphical layout including a first graphical representation indicating satisfaction of the LLM with the one or more guidelines of the set of guidelines of a corresponding application domain and a second graphical representation indicating the evaluations of the pre-trained LLM by the first test case and the second test case;

responsive to a user input received via the GUI, automatically executing a set of actions to modify one or more parameters of the pre-trained LLM; and validating satisfaction of the pre-trained LLM with the set of guidelines by executing the first test case to compare the first expected response of the first test case with a second set of responses received from the pre-trained LLM.

2. The method of claim 1, further comprising:

receiving an indicator of a type of application associated with the pre-trained LLM;

identifying a relevant set of layers associated with the type of the application defining one or more operation boundaries of the pre-trained LLM; and obtaining the relevant set of layers, via an Application Programming Interface (API).

3. The method of claim 1, wherein the variables of the second set of the one or more layers of the set of layers are more complex than the variables of the first set of the one or more layers of the set of layers.

4. The method of claim 1, further comprising:

using the comparison of the first expected response of the first test case to the set of responses received from the pre-trained LLM, generating an indicator of the pre-trained LLM indicating compliance of the pre-trained LLM with the corresponding guidelines of the first set of the one or more layers of the set of layers.

5. The method of claim 4, wherein the indicator indicates one or more of:

the first set of the one or more layers, the corresponding sets of variables of the first set of the one or more layers, or predetermined weights used for each layer of the first set of the one or more layers.

6. The method of claim 1, wherein the graphical representation indicating the satisfaction of the LLM with the one or more guidelines of the set of guidelines of the corresponding application domain includes one or more of:

a binary indicator indicating the satisfaction, a category indicating the satisfaction, or a probability of the satisfaction.

7. The method of claim 1, wherein the set of layers is an LLM-specific set of layers, further comprising:

receiving an input indicative of an overall set of layers and the set of variables for each layer of the overall set of layers;

using an ML model, comparing the application domains within the overall set of layers with the obtained application domains related to the pre-trained LLM; and extracting the LLM-specific set of layers from the overall set of layers using the comparison.

8. A non-transitory, computer-readable storage medium storing instructions for constructing layered prompts to operate as an input into a pre-trained large language model (LLM), wherein the instructions when executed by at least one data processor of a system, cause the system to:
- obtain a set of application domains of a pre-trained large language model (LLM) in which the pre-trained LLM will be used,
  - wherein the pre-trained LLM is configured to generate, in response to a received input, a response;
- using the set of application domains, determine a set of guidelines defining one or more operation boundaries of the pre-trained LLM by mapping each application domain of the set of application domains to one or more guidelines of the set of guidelines;
- determine a set of layers for the pre-trained LLM associated with the one or more guidelines of the set of guidelines,
  - wherein each layer within the set of layers includes a layer-specific model logic and a set of variables associated with the one or more guidelines of each corresponding layer, wherein the layer-specific model logic includes weights, biases, activation functions, and regulatory or contextual parameters, and
  - wherein each variable in the set of variables represents an attribute identified within the one or more guidelines of each corresponding layer;
- for a first set of one or more layers of the set of layers, construct a first test case comprising (1) a first layered prompt and (2) a first expected response,
  - wherein the constructing the first test case comprises transforming the first set of one or more layers of the set of layers using an AI model, wherein the AI model maps the first test case to a first scenario derived from the first set of one or more layers of the set of layers, and performing computations that contributes to an overall decision-making process using each layer-specific model logic in the pre-trained LLM;
  - wherein the first layered prompt is configured to measure one or more values of a corresponding set of variables of the first set of one or more layers, and
  - wherein the first test case is configured to test the one or more operation boundaries of corresponding guidelines of the first set of the one or more layers of the set of layers;
- execute the first test case to evaluate the pre-trained LLM by:
  - supplying the first layered prompt into the pre-trained LLM, and
  - responsive to inputting the first layered prompt, receiving, from the pre-trained LLM, for the first layered prompt, a set of responses;
- aggregate the set of responses received from each layer using weights for each layer;
- generate an overall result based on the aggregated responses;
- generate an indicator of compliance with the guidelines by comparing the first expected response of the first test case to the set of responses generated as an overall result received from the pre-trained LLM, wherein the indicator of compliance reflects specific layers of the first layered prompt, variables of the first layered prompt, or weights assigned to each layer;
- using the indicator of compliance with the guidelines generated based on comparison of the first expected response of the first test case to the set of responses received from the pre-trained LLM, dynamically construct a second test case testing a second set of one or more layers of the set of layers occurring subsequent to the first set of one of more layers of the set of layers, wherein the constructing the second test case comprises transforming the second set of one or more layers of the set of layers using an AI model,
  - wherein the second test case maps to a second scenario derived from the second set of one or more layers of the set of layers, and
  - wherein the second test case comprises: (1) a second layered prompt and (2) a second expected response, and
  - wherein the second test case is configured to test the one or more operation boundaries of corresponding guidelines of the second set of the one or more layers of the set of layers;
- execute the second test case to evaluate the pre-trained LLM;
- generate for display at a graphical user interface (GUI), a graphical layout including a first graphical representation indicating satisfaction of the LLM with the one or more guidelines of the set of guidelines of a corresponding application domain and a second graphical representation indicating the evaluations of the pre-trained LLM by the first test case and the second test case;
- responsive to a user input received via the GUI, automatically execute a set of actions to modify one or more parameters of the pre-trained LLM; and
- validate satisfaction of the pre-trained LLM with the set of guidelines by executing the first test case to compare the first expected response of the first test case with a second set of responses received from the pre-trained LLM.

9. The non-transitory, computer-readable storage medium of claim 8, wherein the instructions further cause the system to:
- identify one or more new layers within the set of responses, and
- iteratively update the set of layers by adding the one or more new layers to the set of layers.

10. The non-transitory, computer-readable storage medium of claim 8, wherein the instructions further cause the system to:
- assign a weight to each layer within the set of layers of the pre-trained LLM; and
- using the set of responses, generate an overall score indicating satisfaction with the one or more operation boundaries of the corresponding guidelines of the first set of the one or more layers of the set of layers in accordance with the assigned weight of the first set of the one or more layers.

11. The non-transitory, computer-readable storage medium of claim 8,
- wherein the set of layers is dynamically determined by an ML model, and
- wherein the ML model is configured to identify the set of application domains associated with the pre-trained LLM.

12. The non-transitory, computer-readable storage medium of claim 8,
- wherein the set of layers is determined by a received input, and
- wherein the received input indicates the set of application domains associated with the pre-trained LLM.

13. The non-transitory, computer-readable storage medium of claim 8,
 wherein one or more of the layers within the set of layers relates to attempts to access data, and
 wherein a corresponding set of variables of one or more of the layers relate to one or more of:
  an author associated with the attempt,
  a timestamp associated with the attempt,
  a location associated with the attempt,
  a presence of an authorization related to the attempt,
  previous unsuccessful attempts to access the data, or
  frequency of the attempts.

14. The non-transitory, computer-readable storage medium of claim 8,
 wherein one or more of the layers within the set of layers relates to quality of input data, and
 wherein a corresponding set of variables of one or more of the layers relate to one or more of:
  an author associated with the input data,
  a timestamp associated with the input data,
  a location associated with the input data,
  a presence of structured metadata,
  an absence of the structured metadata, or
  outliers in the input data.

15. A system comprising:
 at least one hardware processor; and
 at least one non-transitory memory storing instructions, which, when executed by the at least one hardware processor, cause the system to:
  obtain a set of application domains of a pre-trained large language model (LLM) in which the pre-trained LLM will be used,
   wherein the pre-trained LLM is configured to generate, in response to a received input, a response;
  using the set of application domains, determine a set of guidelines defining one or more operation boundaries of the pre-trained LLM by mapping each application domain of the set of application domains to one or more guidelines of the set of guidelines;
  determine a set of layers for the pre-trained LLM associated with the one or more guidelines of the set of guidelines,
   wherein each layer within the set of layers includes a layer-specific model logic and a set of variables associated with the one or more guidelines of a each corresponding layer, wherein the layer-specific model logic includes weights, biases, activation functions, and regulatory or contextual parameters, and
   wherein each variable in the set of variables represents an attribute identified within the one or more guidelines of each corresponding layer;
  for a first set of one or more layers of the set of layers, construct a first test case comprising (1) a first layered prompt and (2) a first expected response,
   wherein the constructing a first test case comprises transforming the first set of one or more layers of the set of layers using a decision-logic system, wherein the decision-logic system maps the first test case to a first scenario derived from the first set of one or more layers of the set of layers, and performing computations that contributes to an overall decision-making process using each layer-specific model logic in the pre-trained LLM;
   wherein the first layered prompt is configured to measure one or more values of a corresponding set of variables of the first set of one or more layers, and
   wherein the first test case is configured to test the one or more operation boundaries of corresponding guidelines of the first set of the one or more layers of the set of layers;
  execute the first test case to evaluate the pre-trained LLM by:
   supplying the first layered prompt into the pre-trained LLM, and
   responsive to inputting the first layered prompt, receiving, from the pre-trained LLM, for the first layered prompt, a set of responses;
  aggregate the set of responses received from each layer using weights for each layer;
  generate an overall result based on the aggregated responses;
  generate an indicator of compliance with the guidelines by comparing the first expected response of the first test case to the set of responses generated as an overall result received from the pre-trained LLM, wherein the indicator of compliance reflects specific layers of the first layered prompt, variables of the first layered prompt, or weights assigned to each layer;
  using the indicator of compliance with the guidelines generated based on comparison of the first expected response of the first test case to the set of responses received from the pre-trained LLM, dynamically construct a second test case testing a second set of one or more layers of the set of layers occurring subsequent to the first set of one of more layers of the set of layers,
   wherein the constructing the second test case comprises transforming the second set of one or more layers of the set of layers using the decision-logic system, wherein the decision-logic system maps the second test case to a second scenario derived from the second set of one or more layers of the set of layers, and performing computations that contributes to an overall decision-making process using each layer-specific model logic in the pre-trained LLM;
   wherein the second test case comprises: (1) a second layered prompt and (2) a second expected response, and
   wherein the second test case is configured to test the one or more operation boundaries of corresponding guidelines of the second set of the one or more layers of the set of layers;
  execute the second test case to evaluate the pre-trained LLM;
  generate for display at a graphical user interface (GUI), a graphical layout including a first graphical representation indicating satisfaction of the LLM with the one or more guidelines of the set of guidelines of a corresponding application domain and a second graphical representation indicating the evaluations of the pre-trained LLM by the first test case and the second test case;
  responsive to a user input received via the GUI, automatically execute a set of actions to modify one or more parameters of the pre-trained LLM; and
  validate satisfaction of the pre-trained LLM with the set of guidelines by executing the first test case to compare the first expected response of the first test case with a second set of responses received from the pre-trained LLM.

16. The system of claim 15, wherein the second set of the one or more operation boundaries of the set of guidelines is different from the first set of the one or more operation boundaries of the set of guidelines.

17. The system of claim 15, wherein the set of guidelines include one or more of: governmental regulations of a specific jurisdiction, organization-specific regulations, or generative AI applications.

18. The system of claim 15, wherein the second set of the one or more operation boundaries of the set of guidelines is the same as the first set of the one or more operation boundaries of the set of guidelines.

19. The system of claim 15, wherein the instructions further cause the system to:
    determine the set of guidelines, via a ML model, using one or more of:
        a location of the LLM,
        a use case of the LLM, or
        data sources used in the LLM.

20. The system of claim 15,
    wherein the representation is a first representation, and
    wherein the layout includes a second representation of an indicator indicating satisfaction of the LLM with the one or more guidelines of the set of guidelines of a corresponding application domain.

\* \* \* \* \*